(12) United States Patent
Bigliatti et al.

(10) Patent No.: US 9,164,268 B2
(45) Date of Patent: Oct. 20, 2015

(54) LIGHT MIXING OPTICS AND SYSTEMS

(75) Inventors: Claudia Bigliatti, Trino (IT); John R. Householder, Reading, MA (US)

(73) Assignee: Fraen Corporation, Reading, MA (US)

(*) Notice: Subject to any disclaimer, the term of this patent is extended or adjusted under 35 U.S.C. 154(b) by 1142 days.

(21) Appl. No.: 12/699,678

(22) Filed: Feb. 3, 2010

(65) Prior Publication Data
US 2010/0226127 A1 Sep. 9, 2010

Related U.S. Application Data

(60) Provisional application No. 61/149,478, filed on Feb. 3, 2009.

(51) Int. Cl.
*F21V 5/00* (2015.01)
*G02B 19/00* (2006.01)
*F21V 7/00* (2006.01)
*F21Y 101/02* (2006.01)

(52) U.S. Cl.
CPC .............. *G02B 19/0066* (2013.01); *F21V 5/00* (2013.01); *F21V 7/0091* (2013.01); *G02B 19/0028* (2013.01); *F21V 5/002* (2013.01); *F21Y 2101/02* (2013.01)

(58) Field of Classification Search
USPC ............ 362/235, 244, 246, 249.02, 307, 308, 362/309, 311.02, 311.01, 326
See application file for complete search history.

(56) References Cited

U.S. PATENT DOCUMENTS

| 5,343,330 | A * | 8/1994 | Hoffman et al. ............. 359/708 |
| 2007/0064415 | A1 | 3/2007 | Wood |
| 2008/0089062 | A1 | 4/2008 | Vennetier et al. |
| 2008/0130137 | A1 * | 6/2008 | Angelini et al. ............. 359/708 |
| 2008/0151551 | A1 | 6/2008 | Yang et al. |
| 2008/0174996 | A1 | 7/2008 | Lu et al. |
| 2008/0310159 | A1 | 12/2008 | Chinniah et al. |

FOREIGN PATENT DOCUMENTS

WO 2007/069181 6/2007

OTHER PUBLICATIONS

International Search Report and Written Opinion for Application No. PCT/2010-023071, dated Jun. 4, 2010.

(Continued)

*Primary Examiner* — Jong-Suk (James) Lee
*Assistant Examiner* — Leah S MacChiarolo
(74) *Attorney, Agent, or Firm* — Reza Mollaaghababa; Thomas Engellenner; Pepper Hamilton LLP

(57) ABSTRACT

In one aspect, a light-mixing optic is disclosed for use with one or more light sources such as light emitting diodes. In one embodiment, an exemplary optic can include an optical body disposed about an optical axis and having an input and an output surface and a peripheral surface extending between the two. The input surface can form a central cavity for receiving light from the light sources, if not the light sources themselves. Further, the input surface can be shaped to refract substantially all of the light received from the one or more light sources away from the optical axis to the peripheral surface of the optic, where that light (e.g., substantially all of it) can be redirected (e.g., via total internal reflection or specular reflection) to the output surface. An array of microlenses or other surface features can be formed on the output surface. Further embodiments, as well as exemplary design methods, are also disclosed.

34 Claims, 18 Drawing Sheets

(56) References Cited

OTHER PUBLICATIONS

Second Office Action issued Feb. 7, 2014 with Text of the Second Office Action corresponding to Chinese Application No. 201080015435.3 (10 sheets).

Office Action dated Nov. 14, 2013 with English Translation for corresponding Japanese Application 2011-549237.
Office Action issued Sep. 9, 2013 with Text of Second Office Action corresponding to European Application No. 09720629.6 (7 sheets).
Extended European Search Report issued Mar. 10, 2015 corresponding to European Application No. 14193618.7 (4 sheets).

* cited by examiner

LIGHT MIXING OPTICS AND SYSTEMS

CROSS REFERENCE TO RELATED APPLICATIONS

This application claims the benefit of priority of U.S. Provisional Application No. 61/149,478, entitled "Light Mixing Lenses and Systems" and filed Feb. 3, 2009. The teachings of the aforementioned patent application are incorporated by reference in their entirety.

FIELD

The present patent application generally relates to optics and lighting systems, and more particularly to optics and lighting systems for light mixing and/or color mixing, including devices and methods for mixing light from a plurality of light sources, such as light emitting diodes.

BACKGROUND

Optics for high-power light sources, such as light emitting diodes, can have a wide variety of configurations. In many cases, a particular configuration can be characterized by the illumination pattern it produces, by the coherence, intensity, efficiency and uniformity of the light it projects, and/or in other ways. The application for which the lens and/or lighting system is designed may demand a high level of performance in many of these areas.

Many applications call for the ability to mix light from multiple sources, e.g., sources producing light of different colors. Further, light mixing is also useful for systems with large light sources. In both cases, it is difficult to produce uniformly mixed light and reduce source imaging. To date, light-mixing systems have typically provided textured surfaces to spread the light from a light source. The efficiency and capabilities of such systems are limited and their illumination characteristics are typically sub-par.

Accordingly, there is a need for improved light-mixing optics and systems.

SUMMARY

In one exemplary aspect, a light-mixing lens is provided, which includes a lens body disposed about an optical axis and characterized by an output surface, and an input surface and a peripheral surface extending between the input and output surfaces. The input surface can form a cavity for receiving light from at least one light source, such as a light emitting diode (or alternatively, two or more light sources, e.g., each producing light of different color). The input surface can be shaped to refract substantially all of the light received at the input surface from the at least one light source (e.g., about 97 percent or more, about 98 percent or more, about 99 percent or more, or about 100 percent, in some embodiments) away from the optical axis and to or towards the peripheral surface. The peripheral surface can be configured such that substantially all light propagating thereto from the cavity is totally internally reflected to the output surface. The light can exit the lens body at the output surface.

A range of variations are possible. For example, in some embodiments, the input surface can taper to a point on or near the optical axis, and/or can present a convex surface to the light source. In other embodiments, the input surface can form a cavity for receiving light from at least one light source and can provide a positive optical power for refracting that light, e.g., refracting substantially all of that light towards the peripheral surface. In some embodiments, the input surface can be shaped so as to maximize the transfer of light incident thereon to the peripheral surface. In yet other embodiments, the input surface can be shaped to refract substantially all of the light received therein from the at least one light source away from the optical axis such that that light propagates at an angle of about 25 degrees or more relative to the optical axis.

In some embodiments, the input surface can include a proximal section and a distal section with different curvature profiles. For example, the proximal section can present a concave surface to light received from the at least one light source and the distal section can present a convex surface to light received from the at least one light source. In some embodiments, the proximal section can direct light from each of two or more light sources to a substantially similar region ("first region") of the peripheral surface and the distal section can direct light from those light sources to a substantially similar region ("second region") different than the first region.

Other surfaces of the lens can also have a variety of configurations. In some implementations, for example, the output surface can include any of lenslets, micro-lenses, micro-prisms, micro-cylinders, and a textured surface. In some implementations, the lens can couple light generated by the at least one light source from the input surface to the output surface with an efficiency of about 70 percent or greater, which can serve to efficiently mix the light from the at least one light source (or, alternatively, from at least two light sources).

In another exemplary aspect, a light-mixing lens is provided which includes a lens body disposed about an optical axis and characterized by an anterior surface and a posterior surface. A central portion of said posterior surface (also referred to as a "central posterior surface" or an "input surface") can form a central cavity for receiving light from at least one light source, such as a light emitting diode (or alternatively, a plurality of light sources, e.g., each producing light of different color). The central cavity can taper to a point on or near the optical axis and can be shaped to refract at least about 80 percent of the light received in the central cavity from the at least one light source (or in other embodiments, e.g., about 85 percent or more, about 90 percent or more, about 95 percent or more, or substantially all) away from the optical axis to a peripheral portion of the posterior surface. A peripheral portion of the posterior surface can be configured for totally internally reflecting light incident thereon that propagates from the central cavity to the anterior surface of the lens body, where it exits the lens body.

In some embodiments, the central posterior surface can include a proximal section and a distal section with different curvature profiles. For example, the proximal section can present a concave surface to light received from the at least one light source and the distal section can present a convex surface to light received from the at least one light source. In some embodiments, any of lenslets, micro-lenses, micro-prisms, micro-cylinders, and a textured surface can be formed on the anterior surface, e.g., for diffusing light.

In another exemplary aspect, a method of designing a light-mixing lens that receives light from at least one light source, such as a light emitting diode, is provided. Such a method can include defining a lens with a body by an input surface and an output surface and a peripheral surface extending between said input and output surfaces, and configuring the input surface to form a cavity in the lens body for receiving light from at least one light source (or, alternatively, for receiving the at least one light source itself). The method can further include segmenting the input surface into a plurality of refractive segments and shaping the refractive segments so as to redirect at least about 80 percent of the light emitted by the at least one light source and incident on the input surface (or in some embodiments at least about 90 percent, or at least about 95 percent) to the peripheral surface. In other embodiments, the method includes shaping the refractive segments so as to redirect substantially all (e.g., about 97 percent of the light or more, about 98 percent or more, about 99 percent or more, or about 100 percent) of the light emitted by the at least one light source and incident on the input surface to said peripheral surface; and shaping the refractive segments and said peripheral surface such that the redirected light undergoes total internal reflection at the peripheral surface and is directed to the output surface for exiting the lens body.

In some embodiments, each segment of the input surface is shaped to refract substantially all source light rays incident thereon substantially parallel to one another. In some embodiments, each segment of the input surface is shaped to refract substantially all source light rays incident thereon substantially parallel to one another but at an average angle different than those rays reflected by another segment. In some embodiments, the method can further include adding any of lenslets, micro-lenses, micro-prisms, micro-cylinders, and texture to the output surface.

The method can also be applied to design optics that receive light from more than one light source.

In another exemplary aspect, a light-mixing lens is provided, which includes a lens body disposed about an optical axis and characterized by an input surface, an output surface, and a peripheral surface extending therebetween. The input surface can form a central cavity for receiving light from at least one light source (or alternatively, from at least two light sources). The central cavity can have a reflective portion, e.g., defined by a reflecting cone with a physical or optical vertex (which can be, for example, located on or near the optical axis) that faces or points towards the at least one light source. The reflecting cone can be configured for specular reflection, e.g., via metallization. The central cavity can also have a light-transmissive portion, e.g., defined by a lateral wall opposing the reflecting cone and configured to receive light reflected therefrom. The light-transmissive portion can couple light incident thereon to the peripheral surface, and the peripheral surface can be configured for total internal reflection of that light, e.g., to the output surface, where it exits the lens. The output surface can include any of lenslets, micro-lenses, micro-prisms, micro-cylinders, and a textured surface.

In yet another exemplary aspect, a light-mixing optic is provided, which includes an optical body disposed about an optical axis, and includes an output surface and a plurality of reflective input surfaces for receiving light from at least one light source (or, alternatively, from two or more light sources). The plurality of reflective surfaces can be configured to reflect substantially all of that light to a lateral surface of the optical body. A variety of configurations for the reflective input surfaces are possible. For example, the plurality of reflective input surfaces can include, for example, (i) a first reflective surface facing the optical axis for reflecting light from the at least one light source across the optical axis and into the optical body, and (ii) a second reflective surface facing away from the optical axis for reflecting light from the at least one light source away from the optical axis and into the optical body. In some embodiments, the first reflective surface can be disposed between the at least one light source and the second reflective surface, relative to the direction of the optical axis. In some embodiments, the second reflective surface comprises a conic surface with a vertex facing the plurality of light sources. The conic surface can have a physical vertex located on or near the optical axis. The lateral surface can be configured to reflect light (e.g., it can be metallized for specular reflection) propagating thereto from the first and second reflective surfaces to the output surface, where it exits the optic. The output surface can include any of lenslets, micro-lenses, micro-prisms, micro-cylinders, and surface texturing.

In yet another exemplary aspect, a light-mixing optic is provided, which includes a reflector extending along an optical axis between a proximal end for receiving light from at least one light source and a distal end for outputting that light and having an interior surface configured for reflecting light (e.g., via a metallized surface). The optic can also include a reflective cone disposed between proximal and distal ends of the reflector with a vertex pointing towards the at least one light source. The reflective cone can be configured to receive light from the light source and redirect it (e.g., via reflection from a metallized surface thereof) to the interior surface of the reflector, which redirects that light to the distal end of the reflector. In some embodiments, the reflective cone can be sized and located to receive and redirect between about 5 and about 30 percent of the light emitted from the at least one light source and received by the optic. In some embodiments, the reflective cone can be sized and located to receive and redirect light emitted from the at least one light source within an angle of about 10 to about 30 degrees relative to the optical axis. The optic can also include an output surface extending across the distal end of the reflector, where the output surface comprises any of lenslets, micro-lenses, micro-prisms, micro-cylinders, and surface texturing.

In yet another exemplary aspect, a light-mixing optic is provided which includes a lens body having an input surface and an output surface and peripheral surface extending therebetween. The input surface can be configured to receive light from at least one light source (or alternatively, from a plurality of light sources). The output surface can have a central cavity formed therein, and the central cavity can include a plurality of projections extending from the lens body into the cavity. In some embodiments, the projections can extend from a proximal end of the cavity towards the output surface. The projections can present surfaces configured such that light received from the light source undergoes total internal reflection and is redirected to the peripheral surface. The peripheral surface being configured such that light redirected from the projections is totally internally reflected to the output surface for exiting the lens body.

In some embodiments, the projections can be configured such that light undergoing total internal reflection in the projections is redirected out of the projections and re-enters the lens body at a sidewall of the cavity. In some embodiments, the lens body can be configured such that substantially all light received by the input surface from the at least one light source is received at the peripheral surface, either directly from the at least one light source or via redirection by the projections.

In another exemplary aspect, an optical system is provided which includes a diffusing plate optically coupled to a plurality of optical devices for receiving and diffusing light received therefrom. The diffusing plate can have an input surface for receiving light from the plurality of optical devices and an output surface that has any of lenslets, micro-lenses, micro-prisms, micro-cylinders, and surfacing texturing formed thereon. The diffusing plate can be employed with any of the previously-described optical devices described above (e.g., light-mixing lenses, reflectors, and so on) and/or as described below, e.g., in connection with FIGS. 1-17.

For example, in one embodiment, one or more of the optical devices can include lens with a lens body disposed about an optical axis and characterized by an output surface and a input surface and a peripheral surface extending between the input and output surfaces. The input surface can form a cavity for receiving light from at least one light source, and can taper to a point on or near the optical axis. The input surface can be shaped to refract at least about 80 percent of the light received at the input surface from the at least one light source away from the optical axis and to the peripheral surface. The peripheral surface being configured such that light propagating thereto from the cavity is totally internally reflected to the output surface for exiting the lens body.

As another example, in one embodiment, one or more of the optical devices can include a reflector extending along an optical axis between a proximal end for receiving light from at least one light source and a distal end for outputting that light to the diffusing plate. The optical device can also have an interior surface configured for reflecting light. The optical device can also include a reflective cone disposed between proximal and distal ends of the reflector with a vertex pointing towards the at least one light source. The reflective cone can be configured to receive light from the light source and redirect it to the interior surface of the reflector, which redirects that light to the distal end of the reflector, where it exits the optical device.

BRIEF DESCRIPTION OF THE DRAWINGS

A further understanding of various aspects of the application can be obtained by reference to the following detailed description in conjunction with the associated drawings, in which.

DETAILED DESCRIPTION

The present application discloses, among other things, optics and lighting systems, and associated methods, which can receive light from one or more separate light sources. Typically, the optics and lighting systems mix the light received from two or more separate light sources, e.g., by receiving the light and projecting it from the lens to a target surface, e.g., in a uniform, patterned, or other controlled manner. In many cases, the two or more light sources may be producing light of different wavelengths (or different sets of wavelengths). In many cases, such differences can result in the light sources producing light of different colors and the lenses and/or systems functioning as color mixers. However, the optics and lighting systems disclosed herein can also be used with light sources that produce light of the same or similar wavelength. Further, in other applications, the optics and lighting systems disclosed herein can be employed with a single light source. For example, in some embodiments, a single light source, e.g., of large size, can be used with the present lenses and systems so as to mix the light coming from each portion of the light source (e.g., because in some cases the size of the light source means it cannot be treated as a point source) and/or to reduce source imaging. Further, in some embodiments, the optics and the systems of the invention can be utilized for effective mixing of light generated by spatially separate individual sources of single color that collectively make up a single large source of light.

The devices and methods disclosed herein can be used with a wide variety of light sources, including light-emitting-diodes and incandescent bulbs, or other coherent or non-coherent sources. Such devices and methods can have a wide range of applications, including, for example, in spot lighting, customizable/adjustable lighting systems, household lighting, flashlights, wearable headlamps or other body-mounted lighting, among others.

Throughout this application, the term "e.g." will be used as an abbreviation of the non-limiting term "for example." It should be understood that regardless of whether explicitly stated or not, all characteristics of the optics described herein are by way of example only, and not necessarily requirements. All Figures merely depict exemplary embodiments of the invention.

Figure 1:
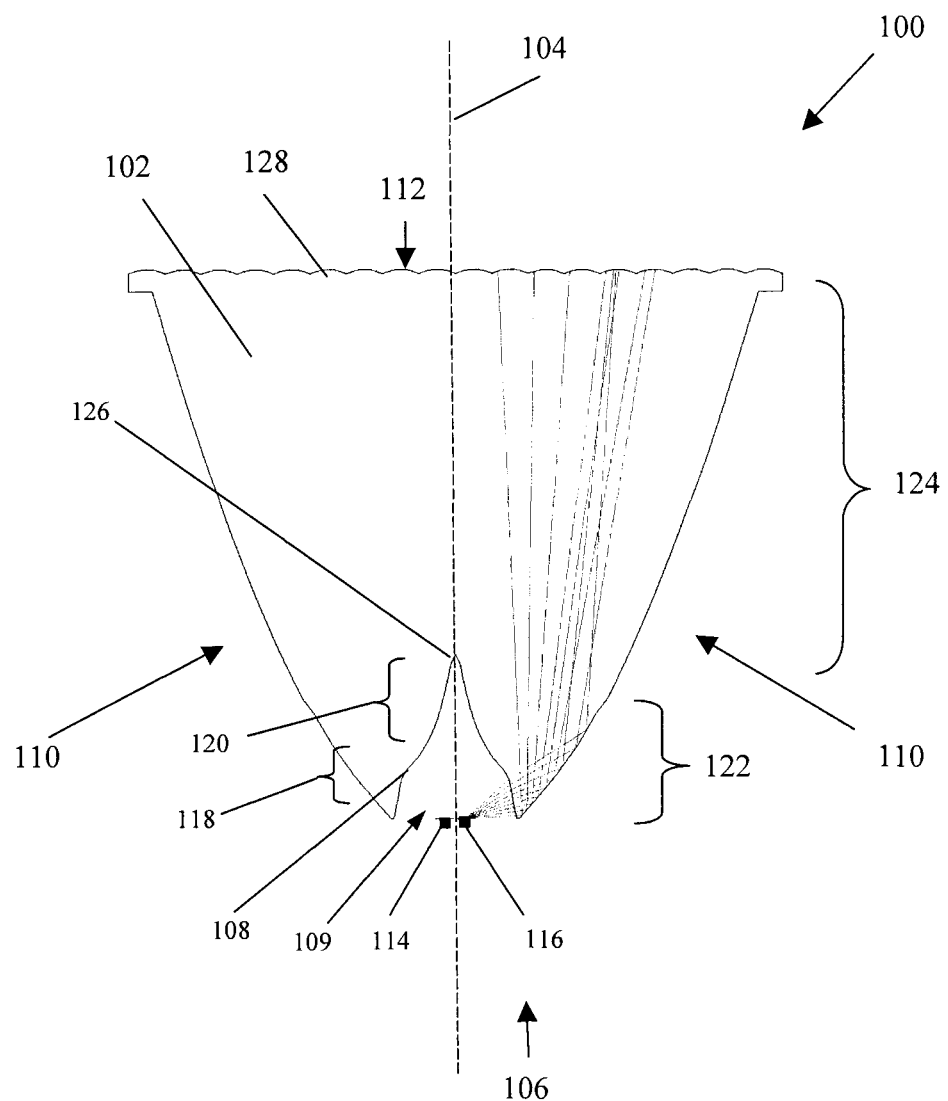
FIG. 1 schematically depicts a cross-sectional view of one embodiment of a light-mixing lens and two light sources, with exemplary ray traces representing light emitted from the right-hand light source.

Turning to FIG. 1, in one exemplary embodiment a lens 100 can include an lens body 102 disposed about an optical axis 104. In this embodiment, the lens body 102 has a posterior surface 106 made up of a central portion 108 ("central posterior surface") and a peripheral portion 110 ("peripheral posterior surface"). The posterior surface 106 can also be characterized or referred to herein as having an input surface 108 and a peripheral or lateral surface 110. The lens body 102 also includes an anterior surface 112 (herein also referred to as an output surface). An array of lenslets 128, which will be described in more detail below, is formed on the anterior surface 112. Although any numbers of light sources can be employed, FIG. 1 shows two spatially separate light sources 114, 116, such as light emitting diodes, which are at the proximal end of the lens body 102. (It should be understood that as shown the lens body 102 in FIG. 1 is axially symmetric and that FIG. 1 merely represents a cross-sectional view.)

Generally speaking, in this embodiment, the central posterior surface 108 forms a recess or cavity 109 formed in the posterior surface 106. The cavity 109 can be configured to receive the light sources 114, 116 themselves, e.g., light-emitting diode packages, within the cavity 109. In other embodiments, the light sources 114, 116 can be disposed proximal to the lens and the cavity can receive only the light from the light sources. Regardless, in this embodiment the central posterior surface 108 receives light from the light sources 114, 116, and couples the light from the light sources 114, 116 into the lens body 102. The light emitted by the light sources 114, 116 enters the lens body 102 via refraction at the central posterior surface 108. The peripheral posterior surface 110 can be adapted to reflect light via a wide range of mechanisms, for example via total internal reflection or via specular reflection, such as can be achieved by forming a metallic coating thereon. In the embodiment shown in FIG. 1, the peripheral posterior surface reflects, via total internal reflection, substantially all of the light received from the cavity 109. The totally internally reflected light travels to the anterior surface 112, through which the light exits the lens body 102 (e.g., via refraction) through the lenslet array 128, and propagates towards a target surface.

As is known in the art, total internal reflection can occur at an interface between two media having different indices of refraction when the light traversing the medium having the larger index is incident on the interface at an angle relative to a normal to the interface that exceeds a critical angle, which can be defined by the following relation:

$$\theta_{crit} = \arcsin\frac{n_2}{n_1}$$

where $n_1$ is the refractive index of the medium having the larger index and $n_2$ is the refractive index of the medium having the lower refractive index.

Returning to FIG. 1, the central posterior surface 108 forming the cavity 109 can be shaped to avoid or reduce the passage of light directly therethrough, e.g. to avoid the passage of light parallel to the optical axis 104, and/or to avoid or reduce the image of the light sources 114, 116 in the projected light. Furthermore, in many embodiments, the central posterior surface 108 can be shaped so as to maximize the transfer of light incident thereon to the peripheral surface 110. As shown in FIG. 1, the central posterior surface 108 forms a cavity 109 that tapers distally to a point 126 along the optical axis 104. In some embodiments, the surface 108 can present a convex surface to the light source(s) 114, 116 and taper to the point. In other embodiments, the surface 108 can be characterized by a positive optical power, e.g., to converge light incident thereon and direct it to the peripheral surface 110. In many cases, the central posterior surface 108 refracts at least about 80 percent of light received at the input surface 108 away from the optical axis 104 and to the peripheral posterior surface 110 (or in other embodiments at least about 90 percent, or at least about 95 percent). In some cases, the central posterior surface 108 refracts substantially all light received at the input surface 108 away from the optical axis 104 and to the peripheral posterior surface 110.

The term "refraction" is meant to indicate that the light rays change direction, as can occur, for example, when they travel from one medium (e.g., air outside the lens body 102) to another (e.g., the material making up the lens body 102). As one skilled in the art will understand, some light from the light sources 114, 116 can enter the lens body 102 without redirection, for example, if they strike the central posterior surface 108 in a direction normal to the surface 108. The phrase "substantially all" light is refracted is meant to indicate that all but a negligible portion of light, immaterial to the purposes for which the lens is employed, is refracted, e.g., in some cases, about 97% or more of light is so refracted, or in other cases about 98% or more, about 99% or more, or about 100%. Conversely, in some cases, about 3% or less, or 2% or less, or 1% or less, of light passes through the central posterior surface 108 in a direction parallel to the optical axis 104, e.g., by passing through the apex of the tapered point 126 in the cavity 109.

In some embodiments, the central posterior surface 108 refracts at least about 80 percent (or in other embodiments, at least about 90 percent, at least about 95 percent, or substantially all) of light incident thereon away from the optical axis 104 at an angle of about 25 degrees or more (or in other cases about 30 degrees or more, about 45 degrees or more, or about 60 degrees or more).

As shown in FIG. 1, in this embodiment, the central cavity 109 is segmented into a proximal section 118 and a distal section 120, and the peripheral posterior surface 110 has a proximal section 122 and a distal section 124. The proximal section 118 of the central posterior surface 108 can be adapted to redirect (e.g., refract) at least about 80 percent (or in other embodiments, at least about 90 percent, at least about 95 percent, or substantially all) of light incident thereon from both light sources 114, 116 to the proximal section 122 of the peripheral posterior surface 110. The distal section 120 of the central posterior surface 108 can be adapted to redirect (e.g., refract) at least about 80 percent (or in other embodiments, at least about 90 percent, at least about 95 percent, or substantially all) of light incident thereon from both light sources 114, 116 to the distal section 124 of the peripheral posterior surface 110. The phrase "substantially all" light is meant to indicate that all but a negligible portion of light, immaterial to the purposes for which the lens is employed, is passed in such a manner, e.g., in various embodiments, the portion of light passed in such a manner by the central posterior surface 108 can be, for example, about 97% or more (of the light incident thereon), about 98% or more, about 99% or more, or about 100%.

The particular curvature profiles of the proximal and distal sections 118, 120 can vary widely, but in the embodiment shown in FIG. 1, the proximal section 118 of the central posterior surface 108 is frustum-shaped. The proximal section 118 can take the profile of a cone, parabola, or virtually any conic section (e.g., with respect to the optical axis 104). In some embodiments the proximal section 118 of the central posterior surface 108 can present a concave surface to incoming light from the light sources.

As shown in FIG. 1, the distal section 120 of the central posterior surface 108 presents a convex surface to incoming light from the light sources. In other embodiments, the distal section 120 can take the profile of a cone, parabola, or virtually any conic section (e.g., with respect to the optical axis 104).

It should be understood that in other embodiments, the central posterior surface 108 can have only a single section, e.g., a single section that is parabolic, conic, or otherwise and that passes light from both light sources 114, 116 to the peripheral posterior surface 110.

In some embodiments, the proximal and distal sections 122, 124 of the peripheral posterior surface 110 can merely refer to different regions of areas of the peripheral posterior surface 110. The peripheral posterior surface 110 can be generally U-shaped and in many embodiments can take the profile of a cone, parabola, or virtually any conic section (e.g., with respect to the optical axis 104).

In other embodiments, however, the proximal and distal sections 122, 124 can be two distinct sections (e.g., similar to sections 118, 120 of the central surface 108) whose profiles can differ from one another. Each of these sections 122, 124 can be generally U-shaped and in many embodiments can take the profile of a cone, parabola, or virtually any conic section (e.g., with respect to the optical axis 104). In some embodiments, the profiles of the distal section 124 and the proximal section 122 can be similar in shape but be of different sizes.

FIGS. 1-6 include exemplary light ray traces representing light passing through the lens 100. It should be noted that the light ray traces in the Figures (including all FIGS. 1-11 herein) are not intended to necessarily show optimal results that can be achieved or that need to be achieved by employing a lens or lighting system in accordance with the teachings of the invention. Further, it should be understood by those skilled in the art that the light ray traces depicted in any one Figure are not intended to necessarily represent all of the light rays produced by the light sources 114, 116 or present in the lens 100.

FIG. 1 illustrates light rays originating at light source 116 and impinging on the proximal section 118 of the central posterior surface 108. The rays are refracted by the proximal section 118—although it is possible that some rays (e.g., an insubstantial portion in many embodiments) may also be passed directly without being redirected—and propagate to the proximal section 122 of the peripheral posterior surface 110. It should be understood that it is possible some rays (e.g., an insubstantial portion, in many embodiments) may also be passed directly without being redirected.

The rays are reflected at peripheral surface 110 (e.g., via total internal reflection and/or specular reflection) to the anterior surface 112, where they exit the lens 100 via lenslet array 128. The exiting light rays and the lenslet array 128 will be described in more detail below in connection with the exemplary ray traces of FIGS. 7-10.

Figure 2:
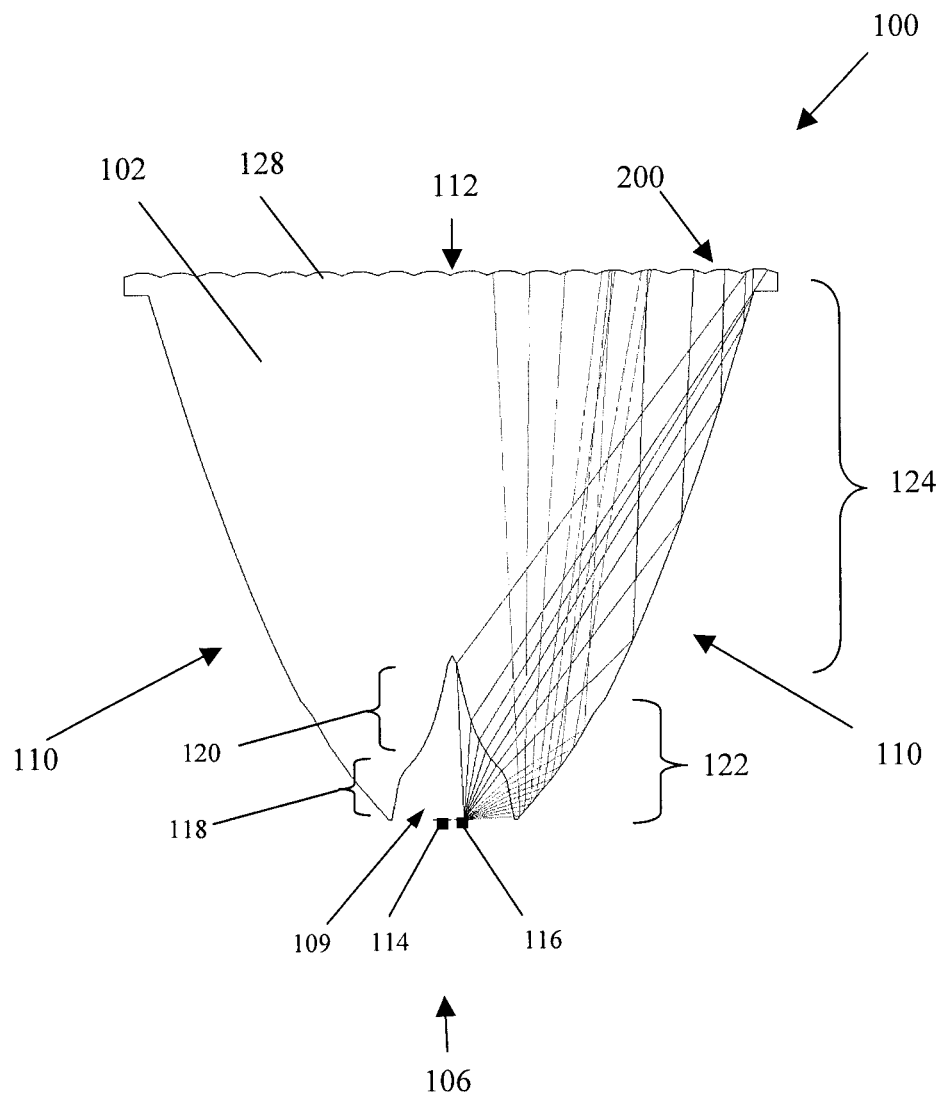
FIG. 2 schematically depicts a cross-sectional view of the light mixing lens shown in FIG. 1, with additional exemplary ray traces representing light emitted from the right-hand light source.

FIG. 2 illustrates exemplary light rays originating from light source 116 that impinge on both the proximal and distal sections 118, 120 of the central posterior surface 108. The rays incident on the proximal section 118 propagate as described above in connection with FIG. 1. The rays incident on the distal section 120 are refracted thereby—although, again, some rays may also be passed directly without undergoing refraction—and propagate to the distal section 124 of the peripheral posterior surface 110. However, as shown in FIG. 2, some rays (e.g., exemplary ray 200) can propagate from the distal section 120 of the central posterior surface 108 directly to the anterior surface 112. The rays impinging on the distal section 124 of the peripheral posterior surface 110 are reflected thereby to the anterior surface 112, where they exit the lens 100 via lenslet array 128.

Figure 3:
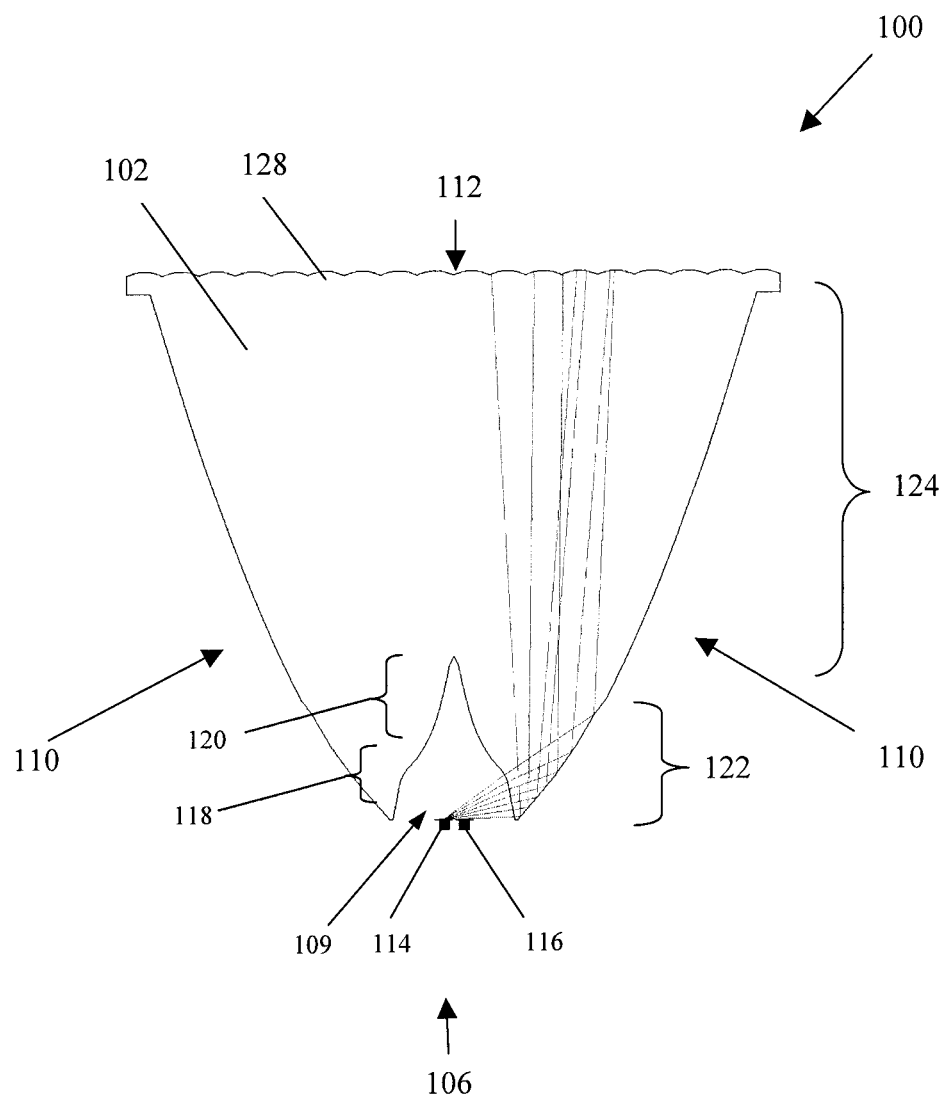
FIG. 3 schematically depicts a cross-sectional view of the light mixing lens shown in FIG. 1, with additional exemplary ray traces representing light emitted from the left-hand light source.

FIG. 3 illustrates exemplary light rays originating from light source 114 and impinging on the proximal section 118 of the central posterior surface 108. The rays are refracted by the proximal section 118—although, again, some rays may also be passed directly without undergoing refraction—and propagate to the proximal section 122 of the peripheral posterior surface 110. The rays are reflected at this surface (e.g., via total internal reflection and/or specular reflection) to the anterior surface 112, where they exit the lens 100 via lenslet array 128.

Figure 4:
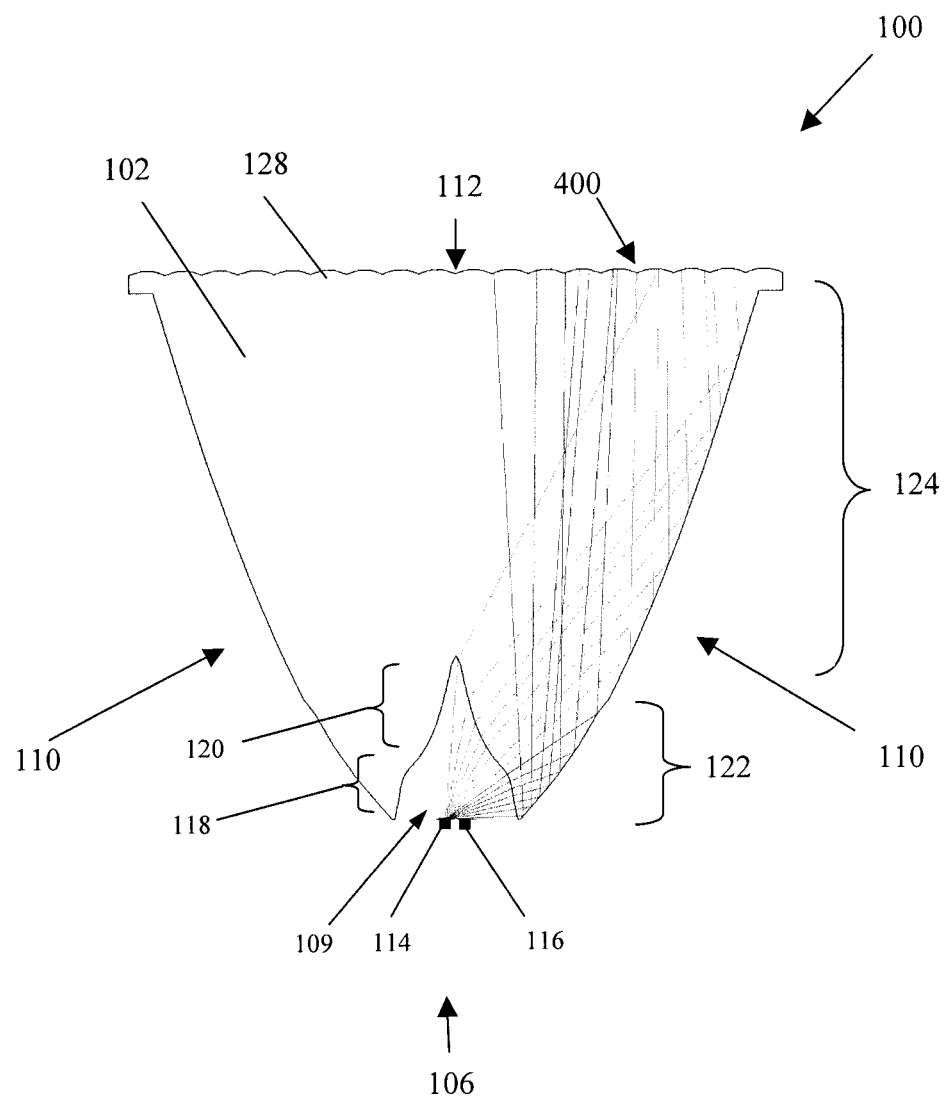
FIG. 4 schematically depicts a cross-sectional view of the light mixing lens show in FIG. 1, with additional exemplary ray traces representing light emitted from the right-hand and left-hand light sources.

FIG. 4 illustrates exemplary light rays originating from light source 114 and impinging on both the proximal and distal sections 118, 120 of the central posterior surface 108. The rays incident on the proximal section 118 propagate as described above in connection with FIG. 3. The rays incident on the distal section 120 are refracted thereby—although, again, some rays may also be passed directly without undergoing refraction—and propagate to the distal section 124 of the peripheral posterior surface 110. However, as shown in FIG. 4, some rays (e.g., exemplary ray 400) may propagate from the distal section 120 of the central posterior surface 108 directly to the anterior surface 112. The rays impinging on the distal section 124 of the peripheral posterior surface 110 are reflected thereby to the anterior surface 112, where they exit the lens 100 via lenslet array 128.

Figure 5:
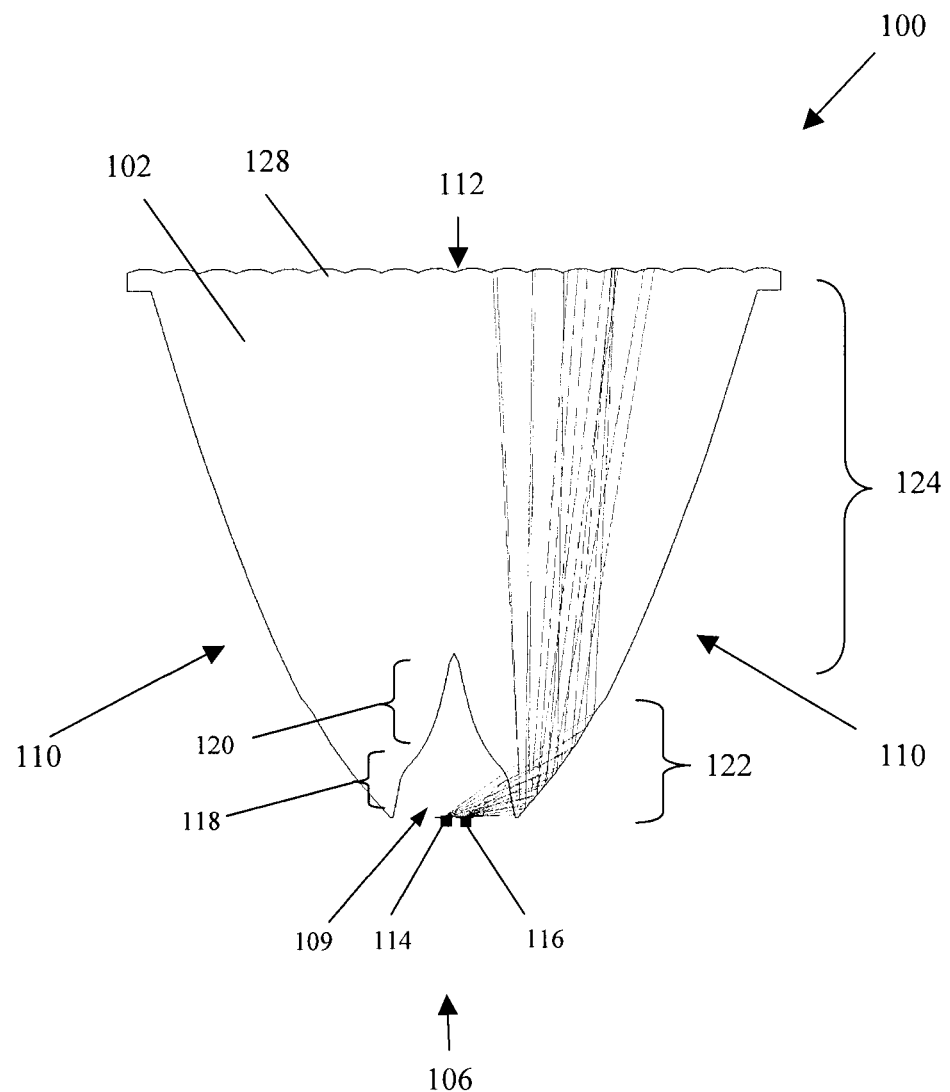
FIG. 5 schematically depicts a cross-sectional view of the light mixing lens shown in FIG. 1, with additional exemplary ray traces representing light emitted from the right-hand and left-hand light sources passing through a proximal portion of the central cavity.

FIG. 5 illustrates exemplary light rays originating from both light sources 114, 116 and refracted at proximal section 118 to be directed to proximal section 122 of the peripheral surface 110 (that is, light from each light source is directed to the same section of the peripheral surface), where they are reflected to the output surface 112, as previously described and shown separately with respect to FIGS. 1 and 3.

Figure 6:
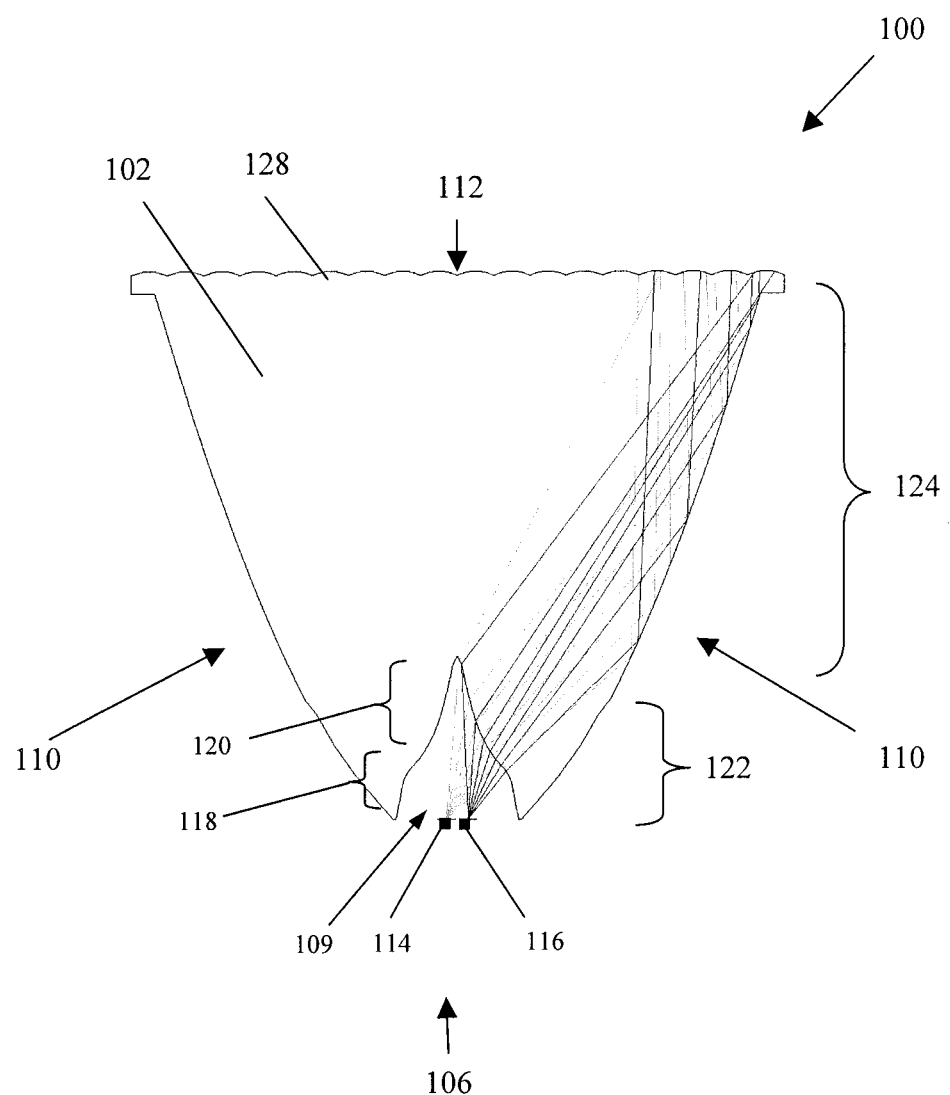
FIG. 6 schematically depicts a cross-sectional view of the light mixing lens shown in FIG. 1, with additional exemplary ray traces representing light emitted from the right-hand and left-hand light sources passing through a distal portion of the central cavity.

FIG. 6 illustrates exemplary light rays originating from both light sources 114, 116 and refracted at distal section 120 to be directed to proximal section 124 of the peripheral surface 110 (that is, light from each light source is directed to the same section of the peripheral surface), where they are reflected to the output surface 112, as previously described and shown separately with respect to FIGS. 2 and 4.

Figure 7:
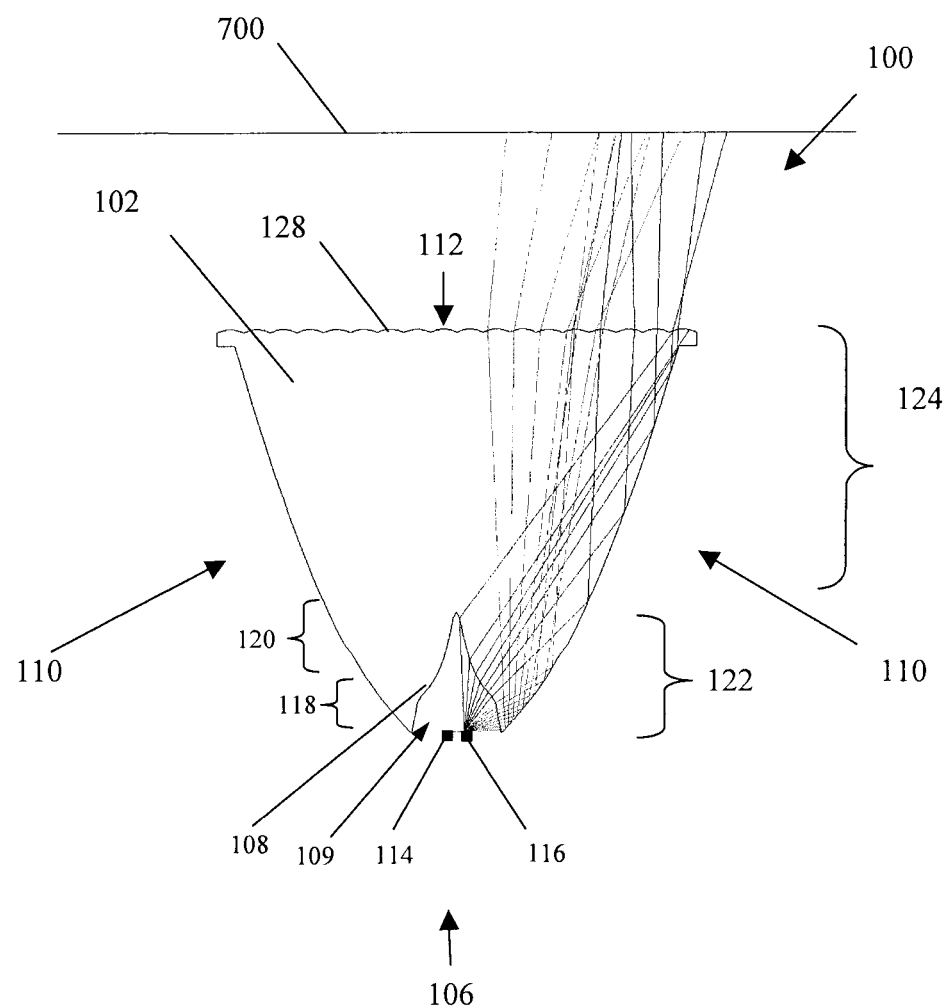
FIG. 7 schematically depicts a cross-sectional view of the light mixing lens shown in FIG. 1, with additional exemplary ray traces representing light emitted from the right-hand light source passing through the lens and hitting a target surface.

FIG. 7 illustrates the paths of exemplary light rays originating from light source 116 and impinging on both the proximal and distal sections 118, 120 of the central posterior surface 108, as illustrated above in connection with FIG. 2. In addition, FIG. 7 further illustrates such exemplary light rays exiting the anterior surface 112 of the lens 100 via the lenslet array 128 and impinging on a target surface 700. Lenslet array 128 can have a wide variety of configurations, but as shown in FIG. 7 the array 128 includes a plurality of microlenses, each having a convex surface to provide a focusing power. In some embodiments the focusing power can be, e.g., in a range of about 0.05 D to about 0.1 D, or in other embodiments, in a range of about 0.4 D to about 0.6 D. The radius of curvature can be in a range of about 10 mm to about 20 mm, or in other embodiments in a range of about 2.5 mm to about 1.7 mm.

Other optical structures for spreading or mixing the light at the anterior surface 112 can also be employed as part of or in place of the lenslet array 128. For example, other lenses (e.g., diverging lenses, diffractive lenses), surface texturing (e.g., texturing created in the die-mold or using chemical or mechanical etching or roughening), and so on, can be used on the anterior surface 112 as dictated by the desired output pattern and/or characteristics. Other examples include microlenses, micro-prisms, and micro-cylinders.

Figure 8:
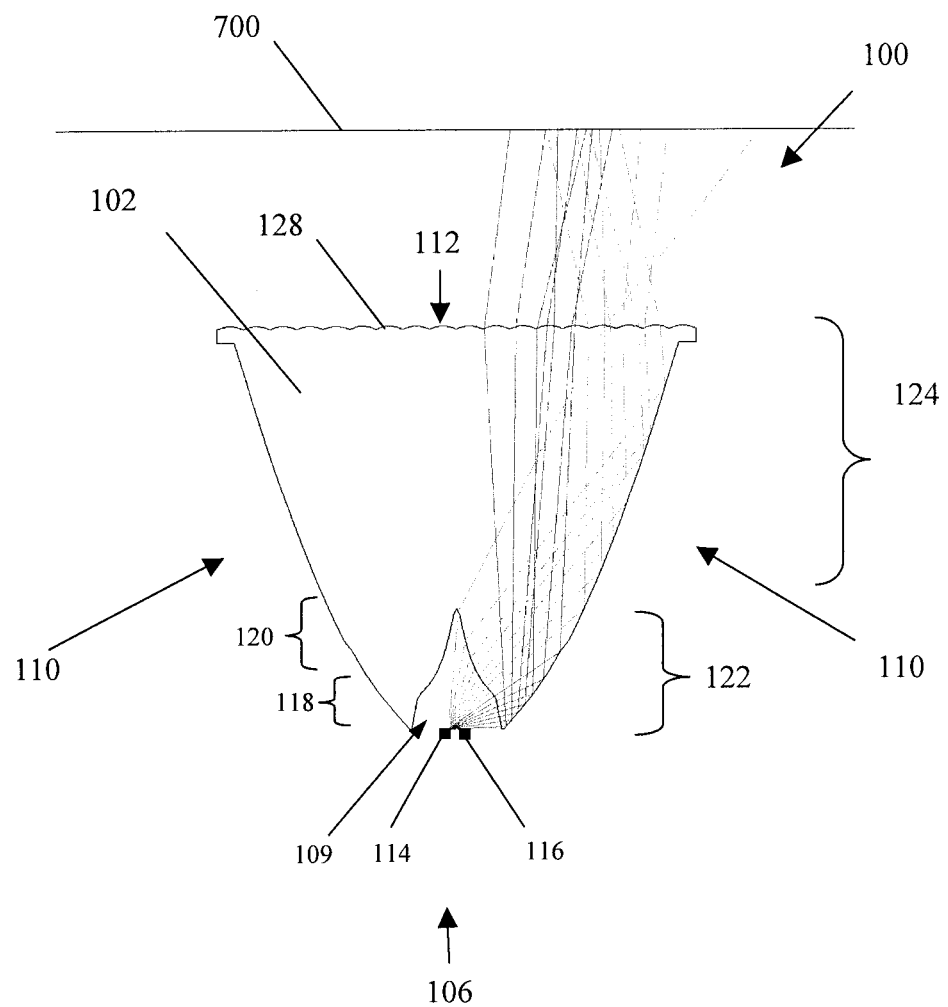
FIG. 8 schematically depicts a cross-sectional view of the light mixing lens shown in FIG. 1, with additional exemplary ray traces representing light emitted from the left-hand light source passing through the lens and hitting a target surface.

FIG. 8 illustrates the paths of exemplary light rays originating from light source 114 and impinging on both the proximal and distal sections 118, 120 of the central posterior surface 108, as illustrated above in connection with FIG. 4. In addition, FIG. 8 further illustrates such exemplary light rays exiting the anterior surface 112 of the lens 100 via the lenslet array 128.

Figure 9:
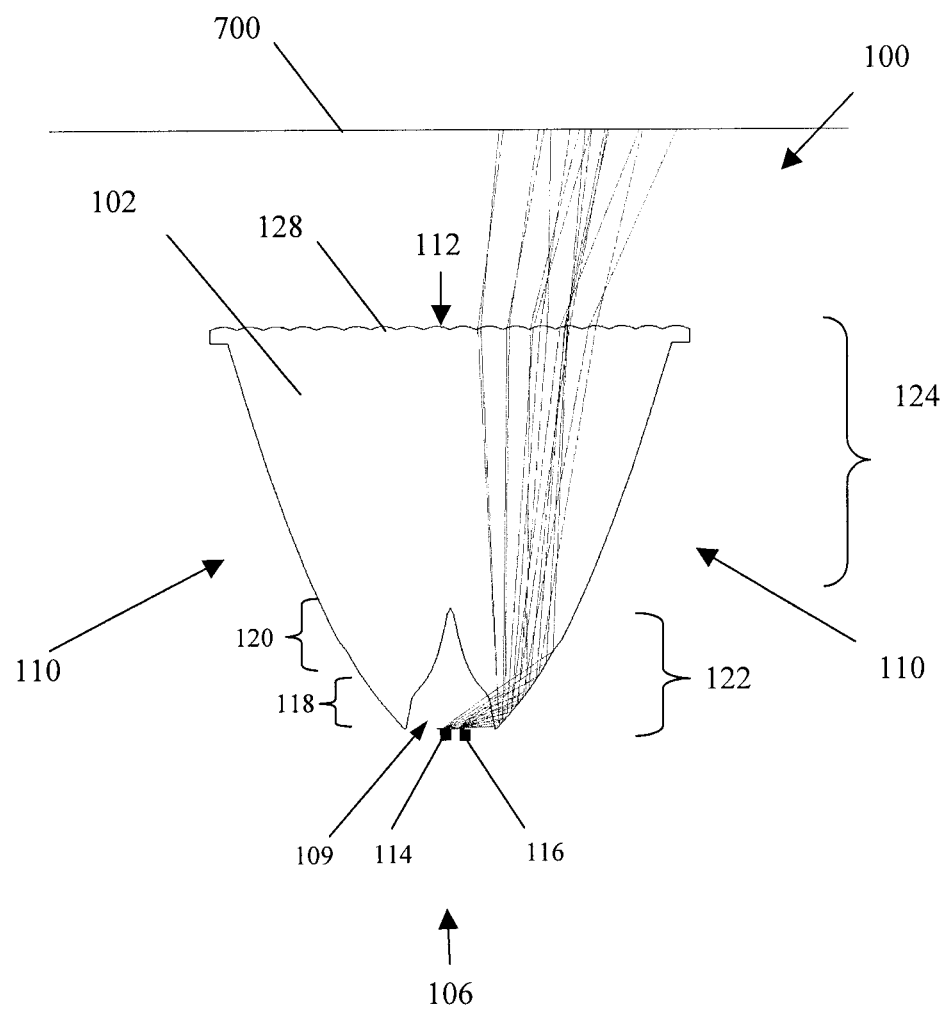
FIG. 9 schematically depicts a cross-sectional view of the light mixing lens shown in FIG. 1, with additional exemplary ray traces representing light emitted from the left-hand light source and the right-hand light source passing through the lens and hitting a target surface.

FIG. 9 illustrates the paths of exemplary light rays originating from both sources 114, 116 and impinging on the proximal section 118 of the central posterior surface 108, as illustrated above in connection with FIG. 5. In addition, FIG. 9 further illustrates such exemplary light rays exiting the anterior surface 112 of the lens 100 via the lenslet array 128.

Figure 10:
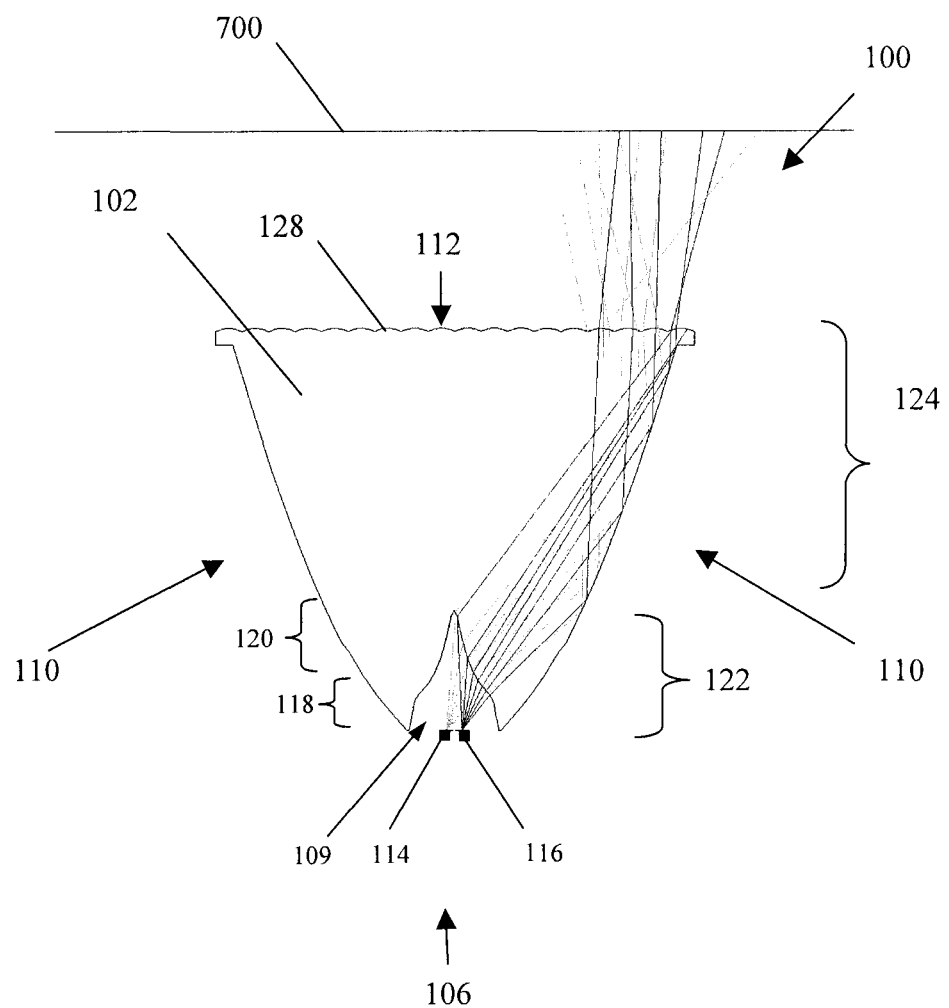
FIG. 10 schematically depicts a cross-sectional view of the light mixing lens shown in FIG. 1, with additional exemplary ray traces representing light emitted from the left-hand light source and the right-hand light source passing through the lens and hitting a target surface.

FIG. 10 illustrates the paths of exemplary light rays originating from both sources 114, 116 and impinging on the distal section 120 of the central posterior surface 108, as illustrated above in connection with FIG. 6. In addition, FIG. 10 further illustrates such exemplary light rays exiting the anterior surface 112 of the lens 100 via the lenslet array 128.

The present application also provides an exemplary method of designing a light-mixing lens. The design of such a lens can involve the use of a computer aided-model for designing optics and/or simulating the light produced by such optics. In one exemplary approach, the design of a lens can be viewed as a series of design goals or parameters for each surface or optical element of a lens. For ease of reference, the following description will use terminology similar to that used above in connection with FIG. 1, but this should not be construed to mean that the lens shown in FIG. 1 must be designed in accordance with the following principles or that FIG. 1 represents a result of performing every part of this exemplary design process.

In one embodiment, a design method can include providing an optical body with an input and output surface. A central cavity can be defined by the input surface for receiving a light source (e.g., from a particular manufacturer) or a plurality of light sources. The surface forming central cavity can be contoured so as to redirect at least about 80 percent, at least about 90 percent, at least about 95 percent, or substantially all (e.g., about 97 percent or more, about 98 percent or more, about 99 percent or more, or about 100 percent) of the light received from the light source(s) and received by the optical body to peripheral or lateral surfaces, which are reflective. This can be achieved by shaping the surface of the cavity to refract substantially all of the light away from the optical axis and into the optical body. The surface of the cavity can be modeled either as a single refractive surface or a sectioned surface joined so as to create a continuous surface (e.g., as in sections 118, 120 shown in FIG. 1). For each ray (e.g., input ray) that strikes a section, a corresponding refracted output ray can be determined or computed to intersect the optical body, and more particularly a location on the peripheral or lateral surface of the optical body, in a desired location. In some embodiments, the sections can be designed such that they produce (e.g., refract) light parallel to one another. In other embodiments, the sections can be designed such that light rays refracted by one section are not parallel to light rays refracted by another section (although the light rays refracted within each section can be parallel to one another).

Figure 17:
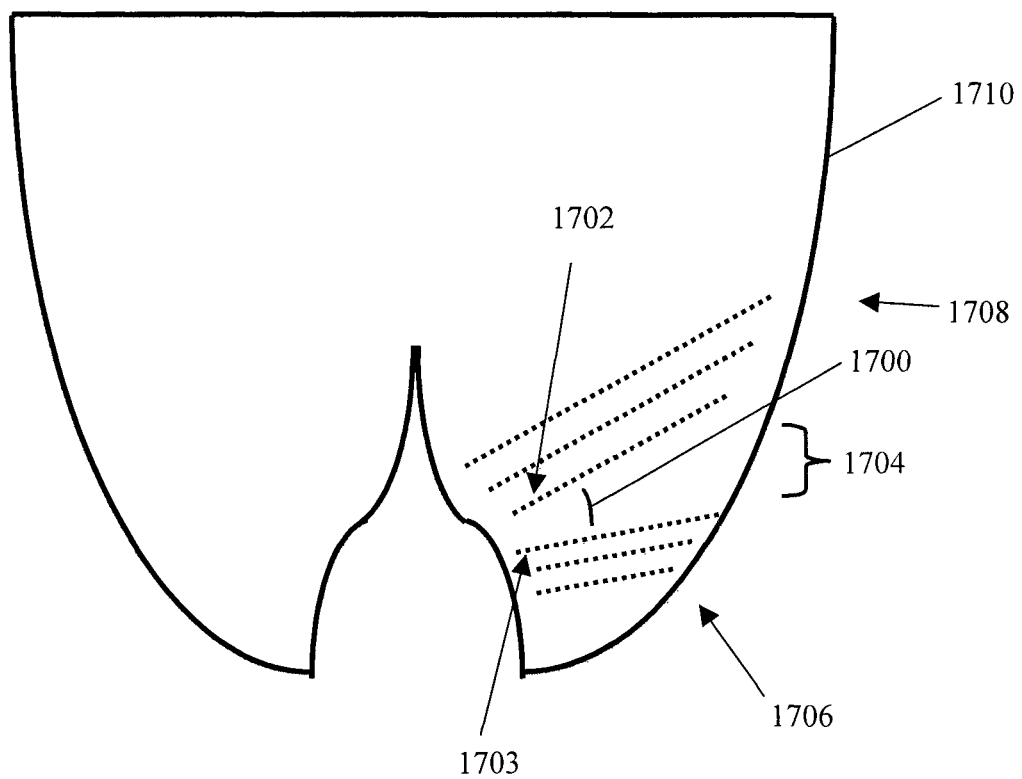
FIG. 17 schematically depicts an exemplary embodiment of a light-mixing lens with a dead zone on a lateral surface thereof; and, FIG. 18 schematically depicts a cross-sectional view of an exemplary embodiment of an optical system including a diffuser optically coupled to light-mixing lens.

The optical body, or more particularly the lateral surface thereof, toward which the light rays have been refracted, can be designed to principally direct light forward to the output surface. If the sections have been designed to produce parallel light rays, then the lateral surface can be a single smooth curve. If the sections have been designed to produce light rays that are not parallel to those of other section(s) (e.g., a different average angle for each section), then in some embodiments fewer or no rays may be passed through an angular region 1700 between edge rays 1702, 1703 of adjacent sections, leading to a dead zone 1704 on the lateral surface 1710, as illustrated in principle in FIG. 17. In such embodiments, the lateral surface 1710 can be divided into two more segments 1706, 1708 on either side of the dead zone 1704, each segment configured to redirect light forward to the output surface.

The lateral surface can be shaped to reflect (e.g., via total internal reflection or specular reflection) light incoming from the central cavity to the output surface. The output surface can be designed as primarily a flat surface. Texture, micro-lenses, micro-prisms, micro-cylinders, or other light-controlling structures can be added to the output surface to achieve desired optical effects, e.g., to improve the mixing and/or uniformity of the light.

In other embodiments, with reference to FIG. 1, the surface 108 forming the cavity 109 can be shaped to maximize the amount of incident light transferred to the peripheral surface 110. With this surface 108 held constant, the body of the lens (including, e.g., the surface 110) can be shaped to optimize a merit function. The merit function can maximize the flux produced by the lens inside an angle (e.g., a solid angle) θ from the optical axis of the lens, which defines the desired illumination area (e.g., on a target surface) and also minimize the flux difference collected in the four quadrants (or other number of sectors) of the target plane.

An exemplary merit function F can be written as:

$$F = \frac{\varphi_{tot}}{\sum_{i \neq j=1}^{4} \sqrt{(\varphi_i - \varphi_j)^2} + \varphi_{out}}$$

where $\varphi_{tot}$ represents the total flux inside angle θ from the optical axis, $\varphi_i$ (i=1, 2, 3, 4 . . . j) represents the flux in each sector (e.g., each quadrant, in which case i=1, 2, 3, 4) of an image plane inside the angle θ, and $\varphi_{out}$ represents the total flux from all sectors at angles greater than θ.

Figure 11:
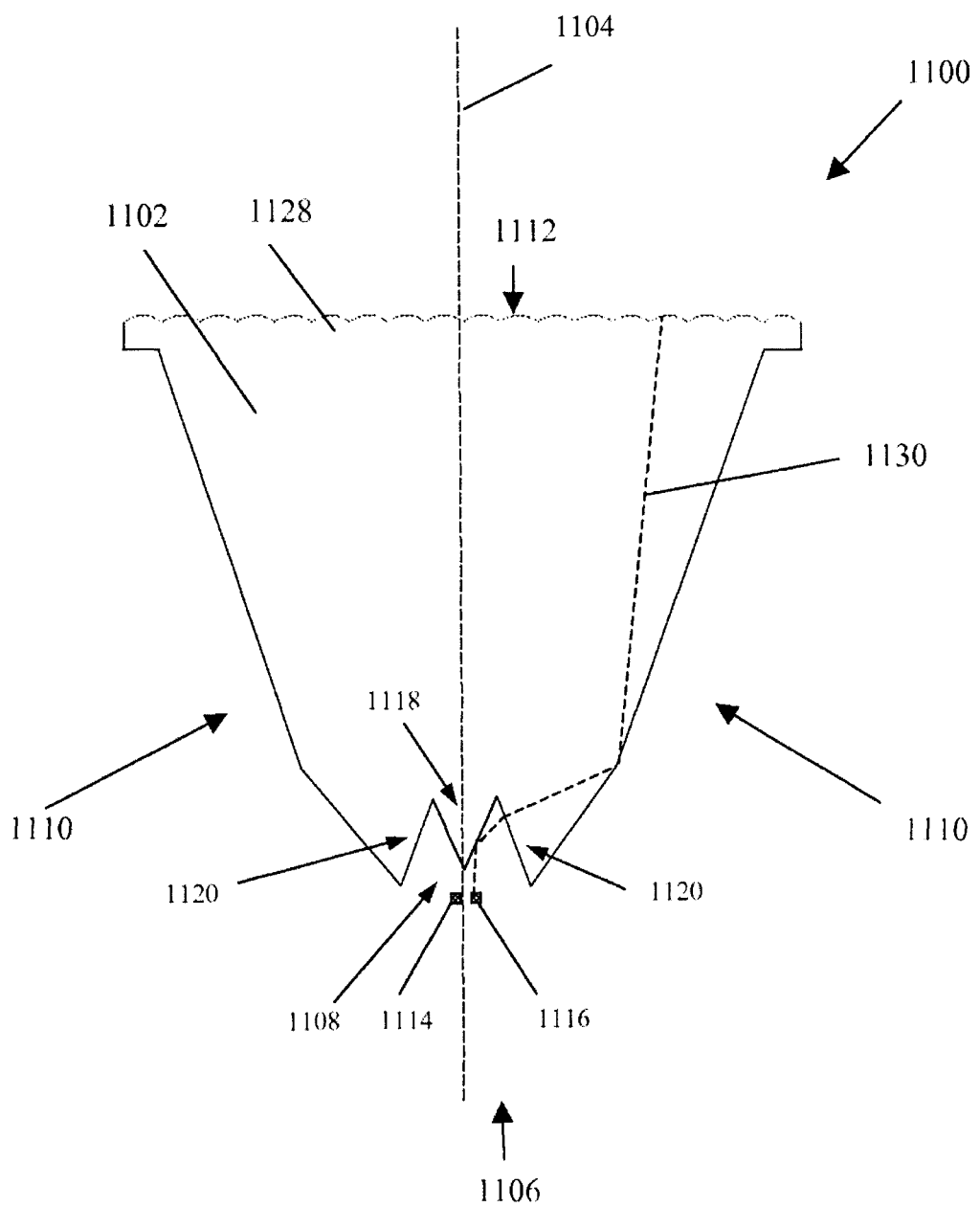
FIG. 11 schematically depicts a cross-sectional view of another embodiment of a light mixing lens with a central reflecting cone and two light sources.

FIG. 11 illustrates an alternate embodiment of a lens 1100, which includes an optic 1102 disposed about an optical axis 1104. In this embodiment, the optic 1102 has a posterior surface 1106 made up of a central portion 1108 ("central posterior surface") and a peripheral portion 1110 ("peripheral posterior surface"). The optic 1102 also includes an anterior surface 1112. Although any numbers of light sources can be employed, FIG. 1 shows two spatially separate light sources 1114, 1116 that are proximal to the posterior surface 1106 of the optic 1102.

In this embodiment, the central posterior surface 1108 forms a cavity and includes a cone-shaped reflective section 1118 (e.g., a reflecting cone). The reflective section has a vertex facing the light sources 1114, 1116 and pointing towards them. In FIG. 1, the vertex is a physical vertex, but in other embodiments, the reflecting cone can be frustum shaped with an optical vertex (e.g., a frustum with sides that, if extended, would intersect to form a vertex). The reflective section 1118 can be metallized to provide a specularly reflective surface.

The central posterior surface 1108 also defines a light-transmissive section 1120 (e.g., which can redirect, via refraction, entering light rays or directly pass them without refraction). The light-transmissive section can be formed by a wall facing the reflective section 1118 and receiving light reflected therefrom. In use, light rays, such as the exemplary ray 1130 shown on FIG. 11, originating from the light sources 1114, 1116 can impinge on the reflective section 1118, from which they are reflected to the light-transmissive section 1120. The rays can enter the optic 1102 through the light-transmissive section 1120, e.g., via refraction, and propagate to the peripheral posterior surface 1110, where they can be reflected to the anterior surface 1112. FIG. 11 further shows that a lenslet array 1128 can be employed on the anterior surface 1112. The lenslet array 1128 can be configured according to any of the embodiments previously described in connection with FIGS. 7-10, above.

In other embodiments, the light-transmissive section 1120 can have multiple sections, e.g., as described above in connection with proximal and distal sections 118, 120 of central anterior surface 108 in FIG. 1. Further, the peripheral posterior surface 1110 can have multiple sections, e.g., as described above in connection with proximal and distal sections 122, 124 of central anterior surface 108 in FIG. 1.

Figure 12:
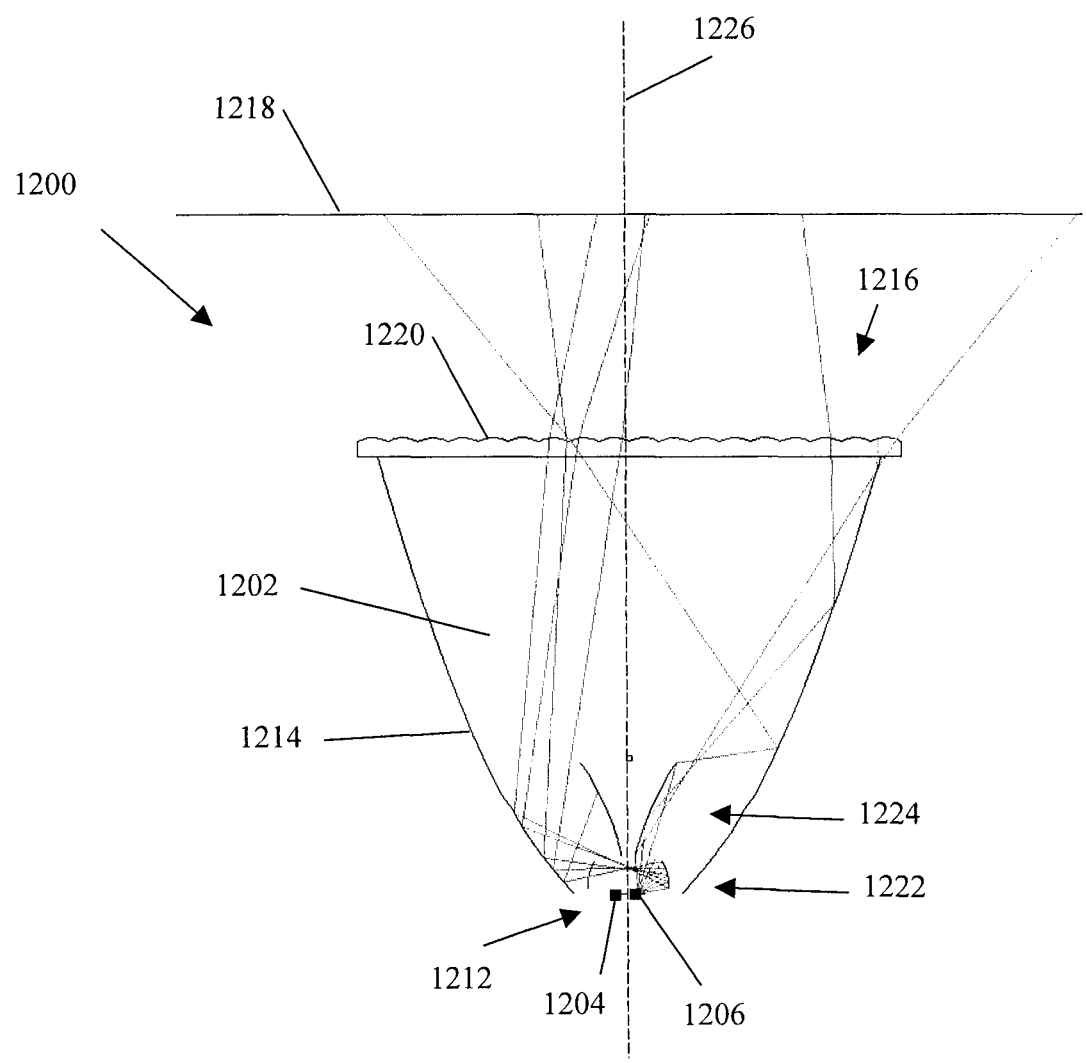
FIG. 12 schematically depicts a cross-sectional view of an exemplary embodiment of a light mixing optic with a plurality of light-reflecting surfaces disposed in a central cavity, and two light sources.

By way of further example, FIG. 12 schematically illustrates an exemplary implementation of an embodiment of a light mixing optic 1200 according to the invention. In this embodiment, an optic body 1202 is coupled to two light sources 1204, 1206 to receive the light generated by those sources. In this implementation, the optic 1200 includes a posterior surface 1212 (input surface) having multiple reflective sections 1222, 1224 that reflect the light from the sources incident thereon to a peripheral reflective surface 1214 of the optic. In many cases, the peripheral reflective surface can be configured for specular reflection, e.g., the surface 1214 can be implemented as a cup-shaped or parabolic reflector metallized for specular reflection. In some embodiments, however, the optic body 1214 can be filled with an optic material so as to configure reflective surface 1214 as a total internal reflection surface.

Regardless, the peripheral reflective surface 1212 (lateral reflective surface) reflects the incident light towards an anterior (output) surface 1216 of the optic, through which the light exits the optic after passage through a lenslet array 1220 to impinge on target surface 1218. Some light rays incident on the posterior surface 1212 undergo reflections at the lower reflective section 1222 and the upper reflective sections 1224 of the posterior surface to be directed toward the peripheral surface. Other rays may reach the peripheral surface directly, that is, without undergoing reflections. The upper reflective surface 1224 can be oriented to face away from the optical axis 1226 so as to reflect light from the light sources 1204, 1206 away from the optical axis and to the peripheral reflective surface 1214. The lower reflective surface 1222 can be oriented to face the optical axis so as to reflect light form the light sources 1204, 1206 across the optical axis 1226 and to the peripheral reflective surface 1214.

Figure 13:
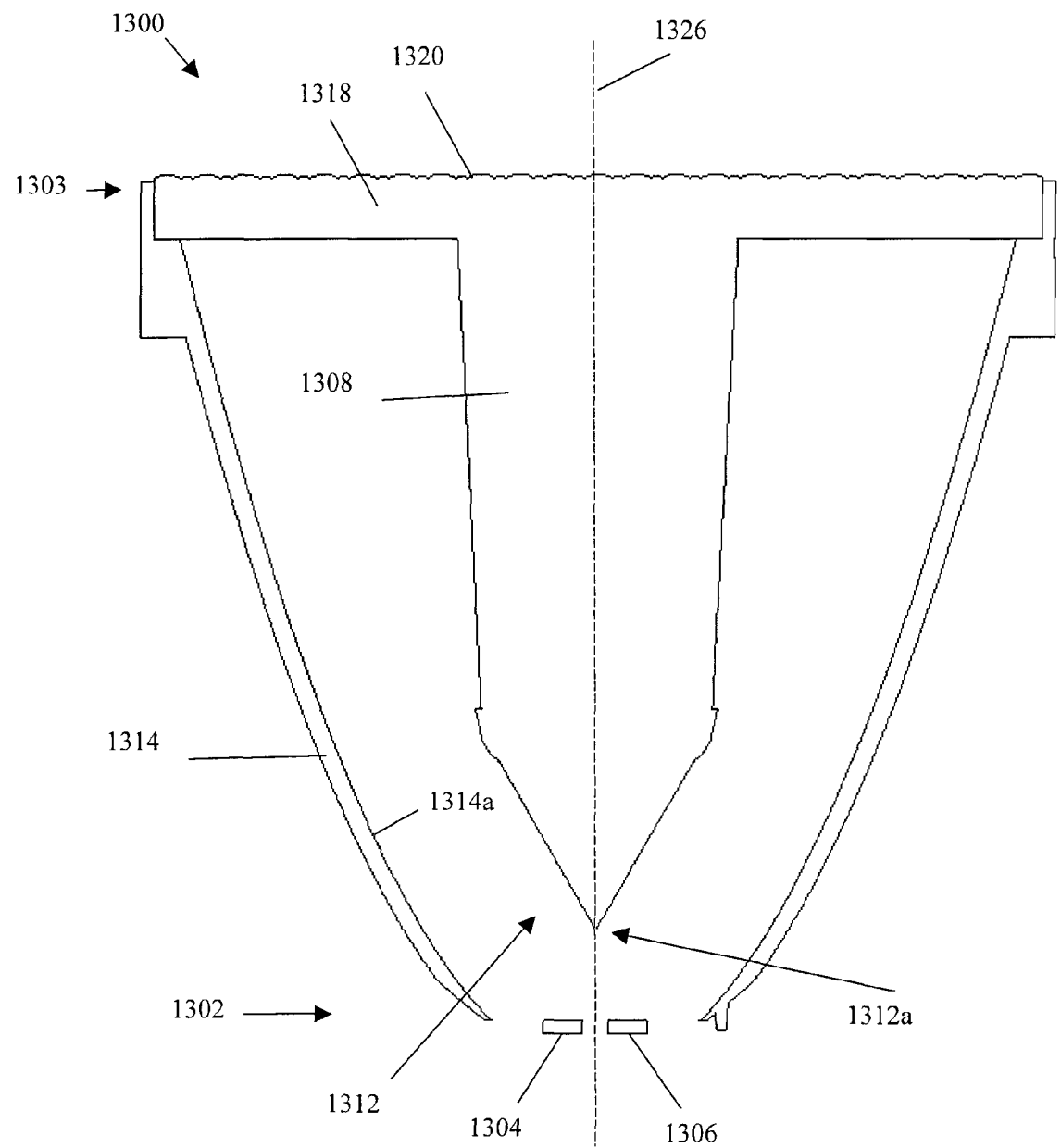
FIG. 13 schematically depicts a cross-sectional view of another exemplary embodiment of a light-mixing optic with two light sources.

FIG. 13 illustrates yet another exemplary embodiment of a light-mixing optic 1300. In this embodiment, the optic 1300 includes a reflector body 1314 disposed about an optical axis 1326. The body 1314 can be parabolic, or nearly parabolic and can have a proximal end 1302 for receiving light from one or more light sources 1304, 1306 and an opposing distal end 1303. The interior surface 1314a of the reflector body 1314 can be configured for specular reflection, e.g., via metallization.

An insert 1308 can be disposed at and extend across the distal end of the reflector body 1314, providing an output surface 1318 which can include a wide range of surface features 1320 formed thereon, e.g., lenslets, micro-lenses, micro-prisms, surface texturing, or otherwise as previously described. The insert 1308 can also extend proximally along the optical axis 1326, ending in a conic reflector 1312. In some embodiments, the reflector 1312 may not be conic but instead be formed of a plurality of reflector planes (e.g., if the optic 1300 is not rotationally symmetric but is rather a rectangular reflector). The reflector 1312 can be disposed with the vertex 1312a facing or pointing towards the light sources 1304, 1306. In this embodiment, it is located on the optical axis 1326. In use, light emitted from the light sources 1304, 1306 can strike the conic reflector 1312, which redirects that light to the interior surface 1314a of the reflector body 1314. In many embodiments, about 5 to about 30 percent of light emitted from the light sources 1304, 1306 and received by the optic 1300 is redirected to the reflector body 1314 by the reflector 1312.

Other light propagates from the light sources directly to surface 1314a. The reflector 1312 redirects that light, as well as the light redirected to the surface 1314a by the reflector 1312, to the output surface 1318 for exiting the optic 1300. As one skilled in the art will understand, some light may be emitted from the light sources and reach the output surface 1318 directly, e.g., without reflection from the reflector 1312 or surface 1314a of the reflector body 1314. However, in many embodiments, at least about 80 percent, at least about 90 percent, or at least about 95 percent, or substantially all (e.g., 97 percent or more, 98 percent or more, and so on) of the light emitted from the light sources 1304, 1306 and received by the optic 1300 is redirected by either the reflector 1312 or interior surface 1314a. In other embodiments, the reflector 1312 is sized and located to receive and redirect light emitted from one or more of the light sources 1304 and/or 1306 within an angle of about 10 to about 30 degrees from the optical axis 1326.

Figure 14:
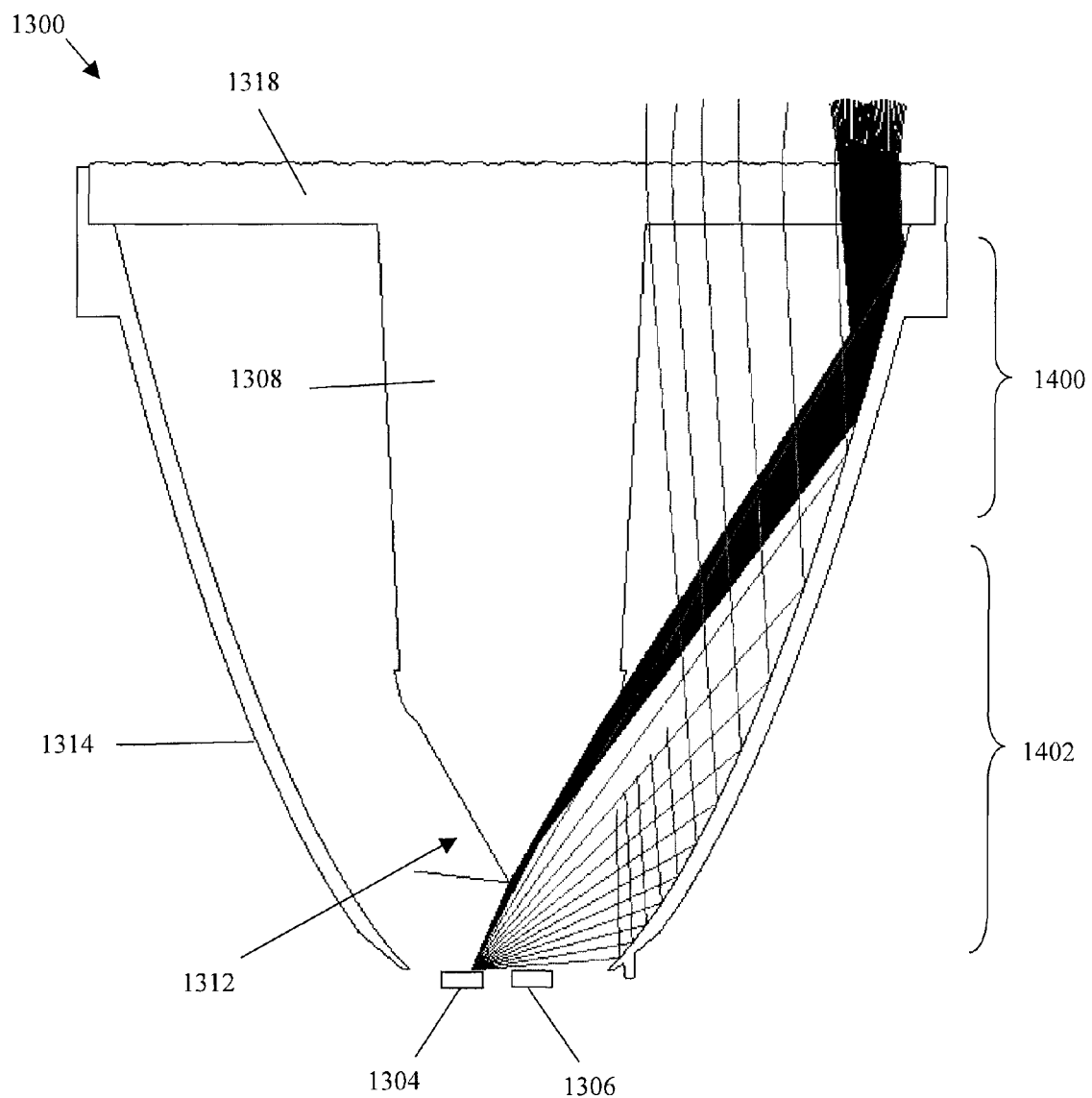
FIG. 14 schematically depicts a cross-sectional view of the optic shown in FIG. 13 with a exemplary ray traces representing light emitted from the left-hand light source.
Figure 15:
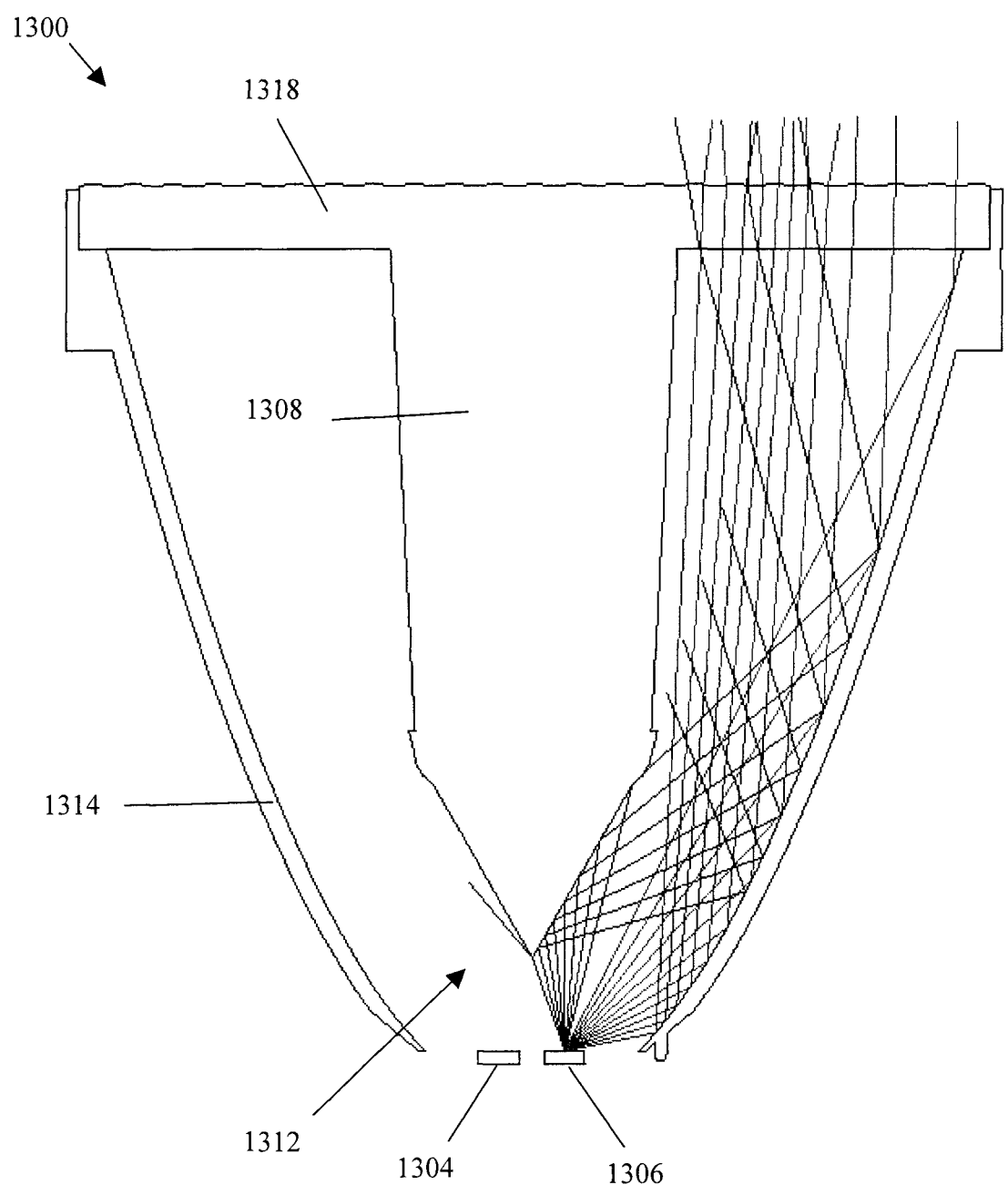
FIG. 15 schematically depicts a cross-sectional view of the optic shown in FIG. 13 with a exemplary ray traces representing light emitted from the right-hand light source.

FIGS. 14 and 15 illustrate exemplary light rays emitted by light sources 1304 and 1306, respectively. For example, in FIG. 14, some light rays are emitted from light source 1304, are reflected by reflector 1312, and strike an upper or distal portion 1400 of the reflector body 1314. Some light rays are emitted from light source 1304 and travel directly to a lower or proximal portion 1402 of the reflector body 1314. In FIG. 15, some light rays are emitted from light source 1306, are reflected by reflector 1312, and strike substantially the same portion 1400 of the reflector body 1314 as rays that are emitted from light source 1304 and travel directly to the reflector body 1314.

As with all embodiments disclosed herein, it should be understood that although illustrated in FIGS. 13-15 with two light sources, the optic 1300 can be configured to receive light from a single light source, or in other embodiments, more than two light sources.

Figure 16:
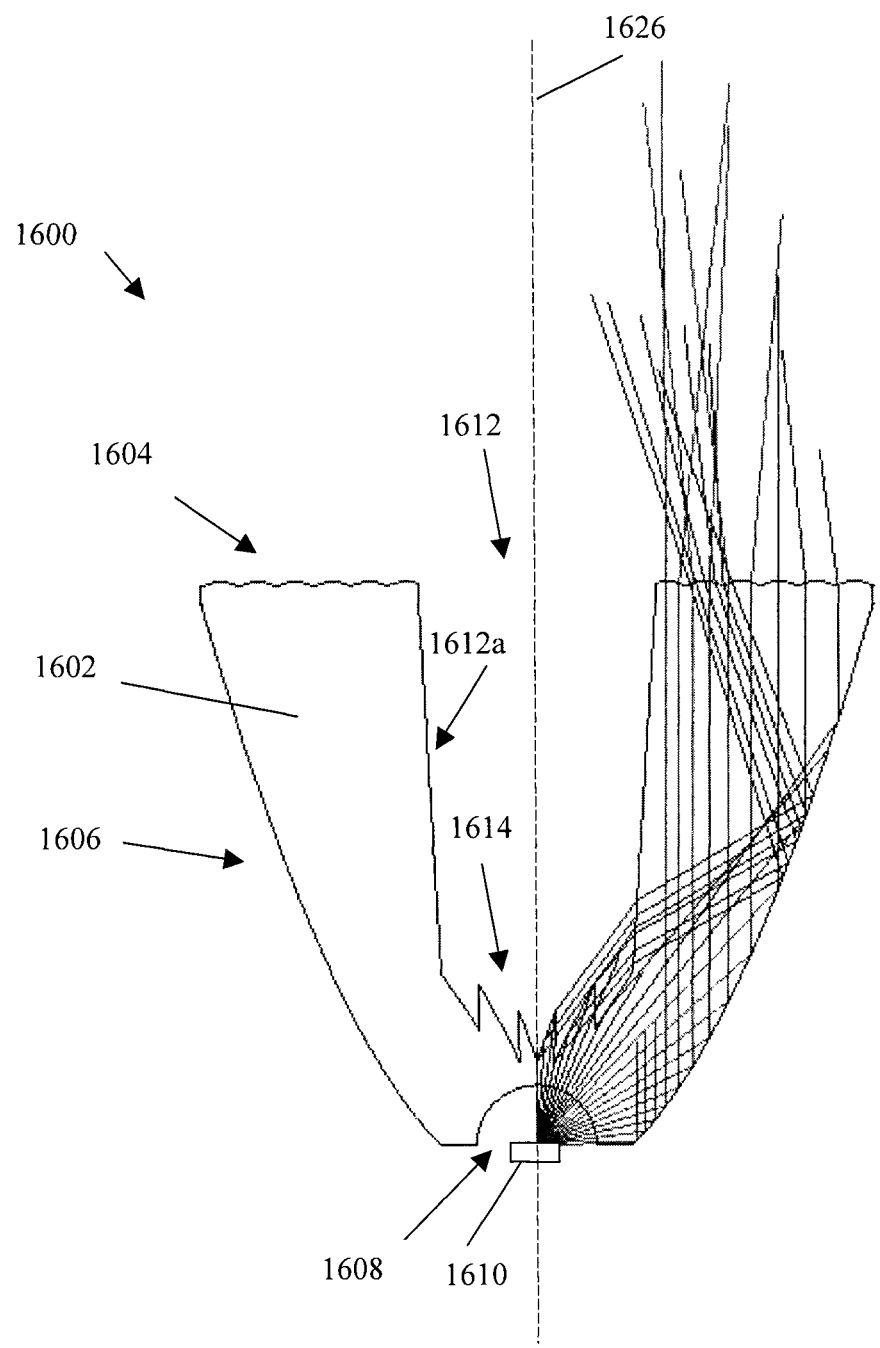
FIG. 16 schematically depicts a cross-sectional view of another exemplary embodiment of a light-mixing optic with a single light source.

FIG. 16 illustrates yet another exemplary embodiment of a light-mixing optic 1600. In this embodiment, the optic 1600 includes an optical body 1602 having an input surface 1608 at a proximal end thereof for receiving light from a light source 1610 (shown here as a single light source, although in other embodiments the optics 1600 can be adapted to receive more than one light source). In this case, the input surface 1608 is concave and configured for receiving light from the light source 1610 (and/or the light source 1610 itself) without significantly altering the path of that light. The optical body 1602 also has an output surface 1604 at a distal end thereof. A peripheral surface 1606 extends between the input and output surfaces 1608,1604.

In this embodiment, a central cavity 1612 is formed in the output surface 1604 such that the output surface 1604 surrounds the central cavity 1612. In FIG. 16, the central cavity 1612 is centered on the optical axis 1626 and the output surface 1608 surrounds the cavity 1612, forming the periphery of the body 1602. The surface at the bottom (or proximal end) of the central cavity 1612 forms a plurality of projections 1614 extending from the lens body 1602 into the cavity 1612. The projections 1614 are shaped such that light received from the light source 1610 is totally internally reflected at the surfaces of the projections 1614 and thereby redirected into a sidewall 1612a of the cavity 1612, where it can re-enter the body 1602, and propagate to the peripheral surface 1606. The light can be refracted at the wall 1612a as it travels this path. For example, in this embodiment, the projections 1614 present angled surfaces to the light propagating from the light source 1610 such that the light strikes them at greater than the critical angle and undergoes total internal reflection. As a result, in this embodiment the projections 1614 form a serrated surface on the bottom of the cavity 1612.

As FIG. 16 illustrates, some light emitted by the light source 1610 can enter the optic body 1602 and propagate directly to the peripheral surface 1606 without being redirected from the projections 1614. In many embodiments, at least about 80 percent of light incident on the input surface 1608 reaches the peripheral surface 1606 in one of these two ways, that is, either directly from the light source 1610 or via redirection by the projections 1614. In other embodiments, at least about 90 percent, or at least about 95 percent, or substantially all light incident on the input surface 1608 reaches the peripheral surface 1606 in one of these two ways, that is, either directly from the light source 1610 or via redirection by the projections 1614.

The peripheral surface 1606 is configured such that light incident on the peripheral surface 1606 (including light propagating directly from the light source 1610 and light redirected by the projections 1614) undergoes total internal reflection at that surface and is redirected towards the output surface 1604. The output surface can have any of a variety of surface features (e.g., lenslets, micro-prisms, surface texturing, and so on) formed thereon, as previously described with respect to other embodiments.

Figure 18:
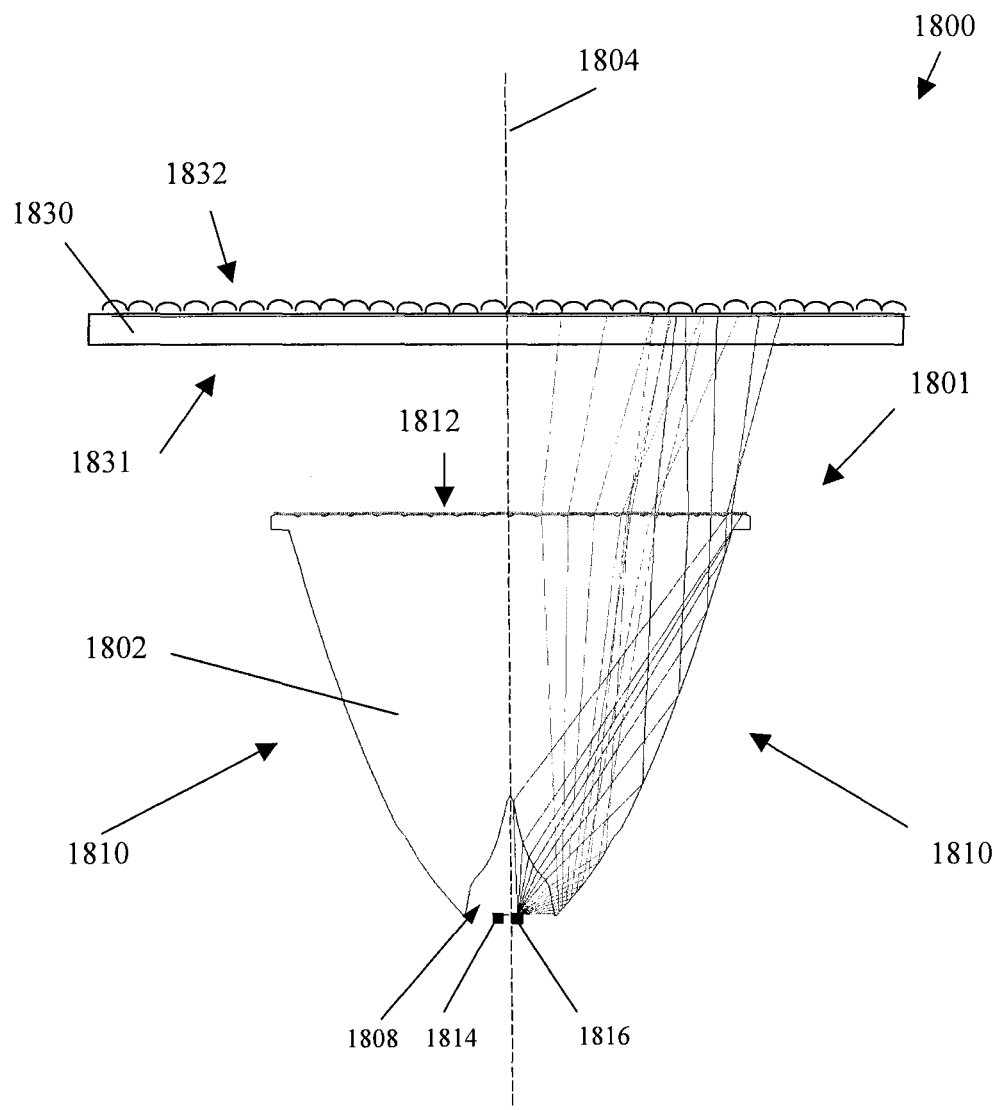

Any of the foregoing optics (e.g., any of the devices illustrated and/or described in connection with FIGS. 1-17) can be employed with a diffuser (e.g., a diffusing plate or panel) or other optical element for spreading, patterning, and/or mixing light. For example, FIG. 18 illustrates an optical system 1800 with a lens 1801 which is implemented similarly, in some respects, to that described in connection with FIG. 1. The lens body 1802 includes an input surface 1808 and an output surface (a first output surface) 1812 with a peripheral surface 1810. The input surface 1808 receives light from light sources 1814 and 1816. In this embodiment, the output surface 1812 is optically neutral, without any surface features formed thereon (e.g., lenslets, micro-lenses, micro-prisms, micro-cylinders, and surfacing texturing), although other in other embodiments the output surface 1812 can include such features. A diffuser 1830 is optically coupled to the lens 1801 and has an input surface 1831 for receiving light from the lens 1801 and an output surface 1832 (a secondary output surface) with a plurality of lenslets formed thereon. In this embodiment, the diffuser 1830 is disposed remotely from the lens 1800, although in other embodiments the diffuser 1830 can be configured to be placed directly over the output surface 1812 of the lens 1801, for example by being placed adjacent to or directly on top of the output surface 1812. In many cases, however, as the location of the diffuser 1830 is moved away from the lens 1800 (e.g., along the axis 1804), the lit appearance and performance of the system 1800 can improve, e.g., the uniformity of the light coming from the system 1800 can be improved. Although as illustrated in FIG. 18, the diffuser 1830 is coupled to one lens 1801, in some embodiments, the diffuser 1830 can be sized for and optically coupled to a plurality of lenses 1801 or other optical devices, each of which can be configured as a collimating device emitting light that passed through the diffuser 1830.

Optics and lighting systems made in accordance with the principles described herein can, in some cases, provide a variety of advantages. For example, in some embodiments, they can prevent light rays emitted by the sources from passing directly through a central portion thereof (e.g., substantially parallel to the optical axis). In some embodiments, they can reduce or avoid imaging the source on a target surface, preserve the angular subtense of the source, and/or create non-uniform color in the far field. Further, in some cases, the utilization of different sets of control surfaces for the light (for example, proximal sections 118 and 124, shown in FIG. 1, acting as one set, and/or distal sections 120 and 122 acting as another set) can provide greater design flexibility by providing the ability to separately control light through each set of control surfaces. Optics and lighting systems made in accordance with the principles described herein can, in some cases, provide an efficiency of at least about 80%, where efficiency is measured as the ratio of total source light to total light exiting an output surface. In other embodiments, such an optic and/or lighting system can exhibit at least about 50% efficiency, at least about 60% efficiency, at least about 70% efficiency, or at least about 75% efficiency.

Optics and lighting systems made in accordance with the principles described herein can in some cases produce a spatial mixture of light on a target surface from two or more separate light sources. For example, in some embodiments, the luminosity at a location on a target surface produced through a lens due to one light source can be about equal to the luminosity produced through the lens due to a second, separate light source, where the light sources are producing illumination of approximately equal intensity. In other words, the ratio of luminosity produced through the lens by each light source at a particular location can be about 1/1, where luminosity is measured, e.g., in units of candelas per square centimeter. In other embodiments, the luminosity ratio can be in a range of about 1/1 to about 1/1.5, or in other embodiments, about 1/1 to about 1/1.25. It should be understood that in some cases such a luminosity ratio can be substantially uniform across an illuminated target region.

It should be noted that the foregoing discussion is not intended to necessarily describe optimal results that can be achieved or that need to be achieved by employing an optic or lighting system in accordance with the teachings of the invention, but merely to illustrate exemplary advantages that may be possible in certain applications.

It should be noted that in the exemplary embodiments disclosed herein the optics are illustrated and described herein in terms of two-dimensional cross-sections which can be extended, e.g., rotationally, in space to create a three-dimensional device. Typically a symmetric three-dimensional extension, e.g., rotationally symmetric about the optical axis 104, can be employed, however the teachings herein can be applied to non-symmetric revolutions as well, e.g., in the case of a oval, parabola, and so on. In addition, the optics described herein can be linearly extended, for example in order to create a rectangular optic.

Any of the lenses or other optics described above can be made of polymethyl methacrylate (PMMA), glass, polycarbonate, cyclic olefin copolymer and cyclic olefin polymer, or any other suitable material. By way of example, a lens can be formed by injection molding, by mechanically cutting a reflector or lens from a block of source material and/or polishing it, by forming a sheet of metal over a spinning mandrel, by pressing a sheet of metal between tooling die representing the final surface geometry including any local facet detail, and so on. Reflective surfaces can be created by a vacuum metallization process which deposits a reflective metallic (e.g., aluminum) coating, by using highly reflective metal substrates via spinning or forming processes. Faceting on reflective surfaces can be created by injection molding, by mechanically cutting a reflector or lens from a block of source material and/or polishing it, by pressing a sheet of metal between tooling die representing the final surface geometry including any local facet detail, and so on.

Any publications or patent applications referred to herein, as well the appended claims, are incorporated by reference herein and are considered to represent part of the disclosure and detailed description of this patent application. Moreover, it should be understood that the features illustrated or described in connection with any exemplary embodiment may be combined with the features of any other embodiments. Such modifications and variations are intended to be within the scope of the present patent application.

The invention claimed is:

1. A light-mixing lens, comprising:
a lens body disposed about an optical axis and characterized by an output surface and an input surface and a peripheral surface extending between the input and output surfaces,
said input surface forming a cavity for receiving light from at least one light source, said cavity having a peripheral surface shaped to refract at least about 80 percent of the light received at the input surface from the at least one light source away from the optical axis and to the peripheral surface of the lens body,
said peripheral surface being configured such that light propagating thereto from the cavity is totally internally reflected to the output surface for exiting the lens body,
wherein said peripheral surface of the cavity comprises a proximal portion configured to present a concave surface to light received from the at least one light source and a distal portion configured to present a convex surface to light received from the at least one light source, and
wherein said distal convex portion tapers to a point on or near the optical axis.

2. The lens of claim 1, wherein the output surface comprises any of lenslets, micro-lenses, micro-prisms, micro-cylinders, and surface texturing.

3. The lens of claim 1, wherein the input surface refracts at least about 97 percent of the light received from the at least one light source away from the optical axis to the peripheral surface of the lens body.

4. The lens of claim 1, wherein the input surface refracts at least about 99 percent of the light received from the at least one light source away from the optical axis to the peripheral surface of the lens body.

5. The lens of claim 1, wherein the input surface is shaped so as to maximize the transfer of light incident thereon to the peripheral surface.

6. The lens of claim 1, wherein said at least one light source comprises two or more light sources and wherein the concave portion of the cavity directs light from each of light sources to a substantially similar region ("first region") of the peripheral surface of the lens body and the convex portion of the cavity directs light from each of the two or more light sources to a substantially similar region ("second region") of the peripheral surface of the lens body different than the first region.

7. The lens of claim 1, wherein the input surface refracts substantially all of the light received therein from the at least one light source away from the optical axis such that that light propagates at an angle of about 25 degrees or more relative to the optical axis.

8. The lens of claim 1, wherein the lens couples light generated by the at least one light source from the input surface to the output surface with an efficiency of about 70 percent or greater to mix the light from the at least one light source.

9. The lens of claim 8, wherein the at least one light source comprises a light emitting diode.

10. The lens of claim 1, wherein the at least one light source comprises a plurality of light sources.

11. The lens of claim 1, further comprising a diffusing plate optically coupled to the output surface for receiving and diffusing light received therefrom, the diffusing plate having any of lenses, micro-lenses, micro-prisms, micro-cylinders, and surface texturing formed thereon.

12. The lens of claim 1, wherein said lens body is configured to mix the light received from said at least one light source so as to reduce source imaging.

13. The lens of claim 12, wherein said input surface is shaped to inhibit formation of an image of said at least one light source by light exiting the lens body.

14. The lens of claim 1, wherein the lens body is configured to mix light from two light sources producing illumination of equal intensity such that a ratio of luminosity produced through the lens at a location on a target surface by the two light sources is in a range of about 1/1 to 1/1.5.

15. The lens of claim 14, wherein the lens body is configured to mix light from two light sources producing illumination of equal intensity such that a ratio of luminosity produced through the lens at a location on a target surface by the two light sources is in a range of about 1/1 to about 1/1.25.

16. The lens of claim 14, wherein the lens body is configured to mix light from two light sources producing illumination of equal intensity such that a ratio of luminosity produced through the lens at a location on a target surface by the two light sources is about 1/1.

17. The lens of claim 14, wherein the ratio of luminosity produced through the lens by the two light sources is substantially uniform across the target surface.

18. The lens of claim 1, wherein the input surface refracts at least about 90 percent of the light received in the cavity from the at least one light source away from the optical axis and to the peripheral surface for at least one position of the light source relative to the lens body.

19. The lens of claim 1, wherein the input surface refracts at least about 95 percent of the light received in the cavity from the at least one light source away from the optical axis to the peripheral surface.

20. A light-mixing lens, comprising:
a lens body disposed about an optical axis and characterized by an anterior surface and a posterior surface, a central portion of said posterior surface ("central posterior surface") forming a central cavity for receiving light from at least one light source, said central cavity tapering to a point on or near the optical axis, the central cavity having a peripheral surface being shaped to refract at least about 80 percent of the light received in the central cavity from the at least one light source away from the optical axis to a peripheral portion of the posterior surface, a peripheral portion of the posterior surface configured for totally internally reflecting light incident thereon that propagates from the central cavity to the anterior surface of the lens body, where it exits the lens body, wherein said peripheral surface of the central cavity comprises a proximal section configured to present a concave surface profile to light received from the at least one light source and a distal section configured to present a convex surface profile to light received from the at least one light source.

21. The lens of claim 20, further comprising any of lenslets, micro-lenses, micro-prisms, micro-cylinders, and a textured surface for diffusing light, formed on the anterior surface.

22. The lens of claim 20, wherein the central posterior surface refracts at least about 90 percent of the light received in the central cavity from the at least one light source away from the optical axis to the peripheral portion of the posterior surface.

23. The lens of claim 20, wherein the central posterior surface refracts at least about 95 percent of the light received in the central cavity from the at least one light source away from the optical axis to the peripheral portion of the posterior surface.

24. The lens of claim 20, wherein the at least one light source comprises a light emitting diode.

25. The lens of claim 20, wherein the at least one light source comprises a plurality of light sources.

26. The lens of claim 20, further comprising a diffusing plate optically coupled to the output surface for receiving and diffusing light received therefrom, the diffusing plate having any of lenslets, micro-lenses, micro-prisms, micro-cylinders, and surface texturing formed thereon.

27. A method of designing a light mixing lens that receives light from at least one light source, comprising:

defining a lens with a body having an input surface and an output surface and a peripheral surface extending between said input and output surfaces;

configuring the input surface to form a cavity in the lens body for receiving light from at least one light source;

segmenting a peripheral surface of said cavity into a plurality of refractive segments such that at least one of said segments presents a concave surface to light received from the light source and at least another of said segments presents a convex surface to light received from the light source;

shaping said refractive segments so as to redirect at least about 80 percent of the light emitted by said at least one light source and incident on said input surface to said peripheral surface of the lens body;

shaping said refractive segments and said peripheral surface of the lens body such that said redirected light undergoes total internal reflection at said peripheral surface of the lens body and is directed to said output surface for exiting the lens body.

28. The method of claim 27, wherein each segment of the input surface is shaped to refract substantially all source light rays incident thereon substantially parallel to one another.

29. The method of claim 28, wherein the peripheral surface is a continuous surface.

30. The method of claim 29, wherein each segment of the input surface is shaped to refract substantially all source light rays incident thereon substantially parallel to one another but at an average angle different than those rays reflected by another segment.

31. The method of claim 27, comprising shaping said refractive segments so as to redirect at least about 97 percent of the light emitted by said light sources and incident on said input surface to said peripheral surface.

32. The method of claim 27, comprising shaping said refractive segments so as to redirect at least about 99 percent of the light emitted by said light sources into the lens body to said peripheral surface.

33. The method of claim 27, further comprising adding any of lenslets, micro-lenses, micro-prisms, micro-cylinders, and texture to the output surface.

34. The method of claim 27, wherein the at least one light source comprises a plurality of light sources.

* * * * *